United States Patent
Shibata et al.

(10) Patent No.: US 8,374,451 B2
(45) Date of Patent: Feb. 12, 2013

(54) IMAGE PROCESSING DEVICE AND IMAGE PROCESSING METHOD FOR REDUCING THE CIRCUIT SCALE

(75) Inventors: Shojiro Shibata, Kanagawa (JP); Takaaki Fuchie, Kanagawa (JP); Kashu Takahashi, Tokyo (JP); Yuya Horiuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/673,216

(22) PCT Filed: Jun. 23, 2009

(86) PCT No.: PCT/JP2009/061807
§ 371 (c)(1),
(2), (4) Date: Feb. 12, 2010

(87) PCT Pub. No.: WO2009/157581
PCT Pub. Date: Dec. 30, 2009

(65) Prior Publication Data
US 2011/0182524 A1    Jul. 28, 2011

(30) Foreign Application Priority Data

Jun. 27, 2008  (JP) ................. 2008-169392
Jun. 27, 2008  (JP) ................. 2008-169395

(51) Int. Cl.
*G06K 9/36*   (2006.01)
*G06K 9/38*   (2006.01)
*G06K 9/46*   (2006.01)

(52) U.S. Cl. .................. 382/251; 382/232; 382/246

(58) Field of Classification Search ................. None
See application file for complete search history.

(56) References Cited

U.S. PATENT DOCUMENTS 5,073,820 A    12/1991  Nakagawa et al.
5,245,427 A *  9/1993   Kunihiro .................... 348/400.1
(Continued)

FOREIGN PATENT DOCUMENTS

CN    1195943    10/1998
CN    1241336    1/2000
(Continued)

OTHER PUBLICATIONS

Joint Video Team (JVT) of ISO/IEC MPEG and ITU-T VCEG, document JVT-C028, Virginia, May 2002.*

(Continued)

*Primary Examiner* — Li Liu
(74) *Attorney, Agent, or Firm* — Frommer Lawrence & Haug LLP; William S. Frommer

(57) ABSTRACT

The present invention enables a circuit configuration to be simplified. An image encoding device (100) receives an input image (91) that is line-scanned in units of MBs as scan blocks, each constituted by a plurality of 4×4 blocks, while being scanned in units of 4×4 blocks as encoding blocks, each constituted by a plurality of pixels. The image encoding device (100) selects a VLC (variable length) table corresponding to a table selection index nC, which is an average value of the numbers nB and nA of nonzero coefficients as encoding values on which variable-length encoding is performed in upper-adjoining and left-adjoining 4×4 blocks of a 4×4 block as an encoding target in quantization coefficients as encoding target data based on the input image (91). At this time, in a case where the 4×4 block as an encoding target is at an upper end of an MB, the image encoding device (100) equates the number nB of nonzero coefficients of the upper-adjoining 4×4 block with the number nA of nonzero coefficients of the left-adjoining 4×4 block. The image encoding device (100) performs variable-length encoding on the number of nonzero coefficients of a 4×4 block as an encoding target in quantization coefficients using the selected VLC table.

3 Claims, 13 Drawing Sheets

U.S. PATENT DOCUMENTS

| | | | |
|---|---|---|---|
| 5,528,298 A * | 6/1996 | Enari et al. | 375/240.03 |
| 5,604,494 A | 2/1997 | Murakami et al. | |
| 5,612,900 A | 3/1997 | Azadegan et al. | |
| 5,703,646 A | 12/1997 | Oda | |
| 5,721,589 A | 2/1998 | Murata | |
| 5,838,826 A * | 11/1998 | Enari et al. | 382/234 |
| 5,870,145 A * | 2/1999 | Yada et al. | 375/240.04 |
| 5,933,532 A | 8/1999 | Mihara | |
| 6,014,467 A * | 1/2000 | Asano | 382/250 |
| 6,023,297 A | 2/2000 | Kobayashi | |
| 6,052,488 A | 4/2000 | Takahashi et al. | |
| 6,100,931 A | 8/2000 | Mihara | |
| 6,163,573 A | 12/2000 | Mihara | |
| 6,337,879 B1 | 1/2002 | Mihara et al. | |
| 6,404,933 B1 * | 6/2002 | Yamamoto | 382/251 |
| 6,438,167 B1 | 8/2002 | Shimizu et al. | |
| 6,493,384 B1 | 12/2002 | Mihara | |
| 6,678,322 B1 | 1/2004 | Mihara | |
| 6,934,330 B2 | 8/2005 | Sugiyama et al. | |
| 7,286,715 B2 | 10/2007 | Togashi et al. | |
| 7,313,184 B2 | 12/2007 | Mihara | |
| RE40,679 E | 3/2009 | Oda | |
| 7,885,471 B2 | 2/2011 | Segall | |
| 2003/0016878 A1 * | 1/2003 | Motosu et al. | 382/251 |
| 2005/0180505 A1 | 8/2005 | Ogawa et al. | |
| 2005/0259730 A1 | 11/2005 | Sun | |
| 2006/0062481 A1 | 3/2006 | Suvanto | |
| 2006/0171460 A1 | 8/2006 | Masuda et al. | |
| 2007/0071094 A1 | 3/2007 | Takeda et al. | |
| 2007/0201553 A1 * | 8/2007 | Shindo | 375/240.03 |
| 2008/0279275 A1 * | 11/2008 | Suzuki | 375/240.03 |
| 2009/0067738 A1 | 3/2009 | Fuchie et al. | |
| 2010/0098173 A1 | 4/2010 | Horiuchi et al. | |
| 2010/0118971 A1 * | 5/2010 | Tanida et al. | 375/240.23 |
| 2010/0135386 A1 | 6/2010 | Shibata et al. | |
| 2010/0266047 A1 | 10/2010 | Takahashi et al. | |
| 2011/0090960 A1 | 4/2011 | Leontaris et al. | |
| 2011/0103480 A1 | 5/2011 | Dane | |
| 2011/0188769 A1 | 8/2011 | Fuchie et al. | |
| 2011/0200266 A1 | 8/2011 | Fuchie et al. | |

FOREIGN PATENT DOCUMENTS

| | | |
|---|---|---|
| CN | 1642285 | 7/2005 |
| EP | 0 871 333 | 10/1998 |
| EP | 0 892 561 | 1/1999 |
| EP | 1 555 831 | 7/2005 |
| EP | 2 028 865 | 2/2009 |
| JP | 4 114585 | 4/1992 |
| JP | 4 135427 | 5/1992 |
| JP | 6 350985 | 12/1994 |
| JP | 7 123273 | 5/1995 |
| JP | 7 322252 | 12/1995 |
| JP | 8 65677 | 3/1996 |
| JP | 8 115205 | 5/1996 |
| JP | 9-247675 | 9/1997 |
| JP | 10 23413 | 1/1998 |
| JP | 10 174098 | 6/1998 |
| JP | 10 341435 | 12/1998 |
| JP | 11 98502 | 4/1999 |
| JP | 2000 261805 | 9/2000 |
| JP | 2000 270323 | 9/2000 |
| JP | 3264043 | 12/2001 |
| JP | 3358620 | 10/2002 |
| JP | 2002 359853 | 12/2002 |
| JP | 2004 7475 | 1/2004 |
| JP | 2004 56680 | 2/2004 |
| JP | 3561962 | 6/2004 |
| JP | 2005 203905 | 7/2005 |
| JP | 2006 67302 | 3/2006 |
| JP | 2006 222555 | 8/2006 |
| JP | 2007 158430 | 6/2007 |
| KR | 10-0264710 | 9/2000 |
| KR | 10-2005-0074286 | 7/2005 |
| WO | WO 98/26602 | 6/1998 |
| WO | WO 99 07158 | 2/1999 |
| WO | WO 2008 065814 | 6/2008 |

OTHER PUBLICATIONS

Joint Final Committee Draft (JFCD) of Joint Video Specification (ITU-T Rec. H. 264 / ISO/IEC 14496-10 AVE) (JVT-D157), [online], ITU-T / ISO/IEC, Jul. 22, 2002, URL:http://wftp3.itu.int/av-arch/ivt-site/2002_07_Klagenfurt/JVT-D157.zip, p.i, 83-90.

Final Office Action issued on Dec. 9, 2011 in related U.S Appl. No. 12/207,611.

Non-Final Office Action issued on Aug. 25. 2011 in related U.S Appl. No. 12/207,611.

Viseito E. et al.: "A Video Compression Algorithm with Adaptive BitAllocation and Quantization", Visual Communication and Image Processing '91: Visual Communication. Boston, Nov. 11-13, 1991; [Proceedings of SPIE], Bellingham, SPIE, US, vol. 1605 Part 01/02, Nov. 11, 1991, pp. 58-72, XP000479218.

Office Action issued in corresponding Chinese patent application No. 200810212084.X on Feb. 24, 2010 and its English translation.

* cited by examiner

IMAGE PROCESSING DEVICE AND IMAGE PROCESSING METHOD FOR REDUCING THE CIRCUIT SCALE

TECHNICAL FIELD

The present invention relates to, for example, an image encoding device or the like, and specifically relates to a technical field of adjusting a generated code quantity to a target code quantity given to one picture without executing intra-screen feedback control.

BACKGROUND ART

Conventionally, in a system or the like for transmitting a bit stream of moving images or recording the bit stream on a recording medium, high-efficiency encoding is performed to efficiently use a transmission path or recording capacity. In an image encoding device for realizing the high-efficiency encoding, the encoding bit rate of a bit stream generated by an encoder is set to a certain rate according to the transfer rate of a transmission medium. Under this restriction, the quantity of data to be generated, i.e., the quantization step of quantization in the encoder, is controlled. That is, the image encoding device increases the quantization step to suppress the quantity of data to be generated when images having a complicated picture pattern continue, for example, whereas decreases the quantization step to increase the quantity of data to be generated when images having a simple picture pattern continue, thereby maintaining a fixed rate to prevent overflow or underflow of a buffer memory.

Therefore, in the image encoding device according to such a related art, the quantization step increases to degrade image quality when complicated images continue, whereas the quantization step decreases when simple images continue, so that uniform image quality cannot be obtained as a whole. In view of this problem, for example, Patent Document 1 discloses an image encoding device that calculates an assigned code quantity to be assigned to each GOP (Group Of Pictures) itself in accordance with the ratio between difficulty in encoding of each GOP and the total sum of difficulties in encoding of a plurality of GOPs so that a large quantity is assigned to a GOP including an image having a complicated picture pattern and that a small quantity is assigned to a GOP including an image having a simple picture pattern.

On the other hand, as a method for adjusting a generated code quantity to a target code quantity given to one picture, step 2 of TM5 (test model 5) is well known, for example. In this method, a code quantity assigned to a picture is evenly distributed to macro blocks (MBs), each distributed quantity being set as a target code quantity of each MB, and adjustment to the target code quantity is performed through feedback control in the picture.

Also, in an encoding process based on a redundant compression method such as MPEG (Moving Picture Experts Group), an image encoding device performs orthogonal transformation such as DCT (Discrete Cosine Transform) and then performs a quantization process, thereby performing a process of reducing the quantity of information. Then, the image encoding device controls the value of the quantization to control a code quantity. At this time, a monotonous reduction relationship is established between a quantization parameter and a generated code quantity. Therefore, the image encoding device can predict a generated code quantity by actually calculating code quantities using quantization values of appropriate intervals and performing linear interpolation on a predictive value of the code quantity positioned at the middle (binary search or the like performed by intra-VTR such as DV).

This method can be applied to not only an encoding method using a fixed table, such as MPEG2, but also a context adaptive encoding method used in AVC (Advanced Video Coding) or the like.

Patent Document 1: Japanese Patent No. 3358620

However, in the above-described method of step 2 of TM5, degradation of image quality may occur in encoding of picture at the top of a sequence or a picture just after change of a scene because the initial value of the quantization step does not conform to the pattern of the picture.

For example, in the method of step 2 of TM5, in the image encoding device, in a case where the quantization step in a portion before feedback follows the picture pattern is too large, the image quality of the portion is degraded compared to the other portion. In a case where the quantization value is too small, too much code quantity is used in the portion and the influence thereof may be exerted on the other portion.

Also, in the image encoding device, the target code quantity of an MB is always kept constant, and thus inappropriate distribution of code quantity occurs when difficulty of an image is uneven in a screen.

On the other hand, in the above-described process of predicting a generated code quantity, the image encoding device needs to have many quantization processing units and code length calculating units in parallel in order to perform precise prediction and reduce errors due to interpolation. In this case, the image encoding device improves the precision for predicting a code quantity by having many circuits in parallel. However, the hardware scale thereof is large, and it is desired to reduce the circuit scale.

Accordingly, the present invention is directed to reducing a circuit scale in predicting a code quantity.

DISCLOSURE OF INVENTION

In order to solve the foregoing problems, in an image processing device according to the present invention, there is provided a variable-length-table selecting unit configured to select a variable-length table corresponding to an average value of encoding values on which variable-length encoding is performed in upper-adjoining and left-adjoining encoding blocks of an encoding block as an encoding target in encoding target data based on an input image that is line-scanned in units of scan blocks, each constituted by a plurality of encoding blocks, while being scanned in units of encoding blocks, each constituted by a plurality of pixels, wherein the variable-length-table selecting unit equates an encoding value of the upper-adjoining encoding block with an encoding value of the left-adjoining encoding block in a case where the encoding block as the encoding target is at an upper end of a scan block when selecting the variable-length table, and a variable-length encoding unit configured to perform variable-length encoding on an encoding value of the encoding block as the encoding target in the encoding target data by using the variable-length table.

Accordingly, the image processing device does not need to store encoding values of one line of an encoding block at the lower end in a scan block.

Also, in an image processing method according to the present invention, a variable-length-table selecting step of selecting a variable-length table corresponding to an average value of encoding values on which variable-length encoding is performed in upper-adjoining and left-adjoining encoding blocks of an encoding block as an encoding target in encoding target data based on an input image that is line-scanned in units of scan blocks, each constituted by a plurality of encoding blocks, while being scanned in units of encoding blocks, each constituted by a plurality of pixels, wherein the variable-length-table selecting step equates an encoding value of the upper-adjoining encoding block with an encoding value of the left-adjoining encoding block in a case where the encoding block as the encoding target is at an upper end of a scan block when selecting the variable-length table, and a variable-length encoding step of performing variable-length encoding on an encoding value of the encoding block as the encoding target in the encoding target data by using the variable-length table.

Accordingly, the image processing method does not need to store encoding values of one line of an encoding block at the lower end in a scan block.

According to the present invention, encoding values of one line of an encoding block at the lower end in a scan block are not required to be stored, and thus it is unnecessary to provide a line memory. Consequently, the image processing device and image processing method enabling the circuit scale to be reduced can be realized.

BEST MODES FOR CARRYING OUT THE INVENTION

Hereinafter, the best modes for carrying out the invention (hereinafter simply referred to as embodiments) will be described in detail with reference to the drawings. The description will be given in the following order.

1. First embodiment (partial sharing in a calculating unit).
2. Second embodiment (circuit configuration of a back search unit)
3. Other embodiments 1. First Embodiment

[1-1. Configuration of Image Encoding Device]

Figure 1:
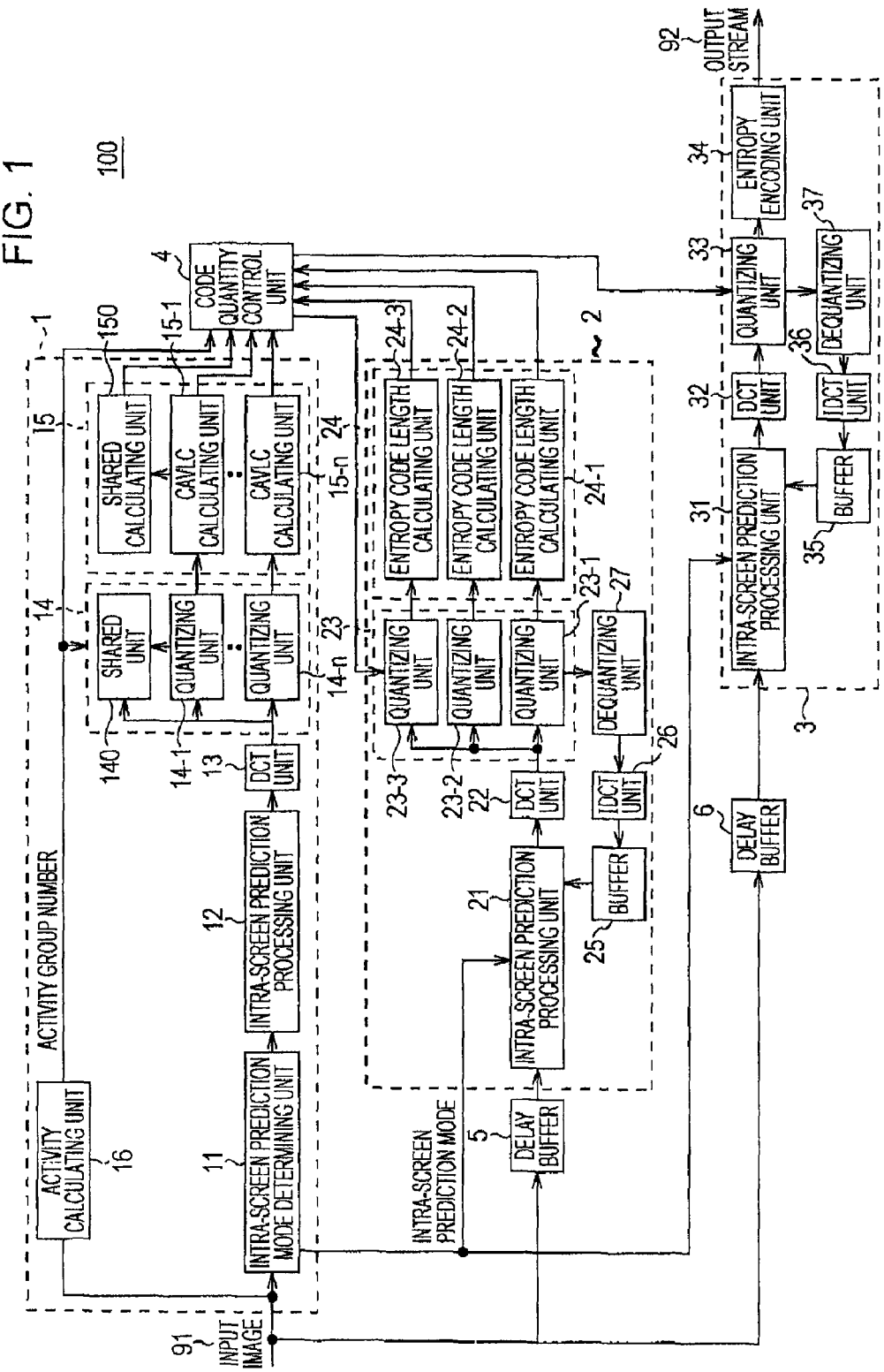
FIG. 1 is a configuration diagram of an image encoding device according to a first embodiment of the present invention.

FIG. 1 illustrates and describes a configuration of an image encoding device 100 according to an embodiment of the present invention.

The image encoding device 100 includes a first pre-encoding unit 1, a second pre-encoding unit 2, a main encoding unit 3, a code quantity control unit 4, and delay buffers 5 and 6.

In order to perform code quantity control, the image encoding device 100 performs pre-encoding in advance using the first pre-encoding unit 1 and the second pre-encoding unit 2, thereby determining main encoding information used in the main encoding unit 3, such as a basic quantization parameter $QP_{MB}$, a predictive quantization matrix Q MatrixD, an intra-screen prediction mode, and an activity group.

At this time, the first pre-encoding unit 1 performs parallel pre-encoding using a wide range of quantization parameters QP, with the precision being slightly decreased and the circuit scale and processing load being suppressed, thereby roughly estimating a predictive quantization parameter QPd for realizing a target code quantity. The second pre-encoding unit 2 performs parallel pre-encoding in a narrow range, with the precision being increased, thereby determining a basic quantization parameter $QP_{MB}$ that is to be used in the main encoding unit 3.

The first pre-encoding unit 1 is a module for performing a first pre-encoding process and includes an intra-screen prediction mode determining unit 11, an intra-screen prediction processing unit 12, a DCT unit 13, a quantizing unit 14, a CAVLC calculating unit 15, and an activity calculating unit 16.

The second pre-encoding unit 2 is a module for performing a second pre-encoding process and includes an intra-screen prediction processing unit 21, a DCT unit 22, a quantizing unit 23, an entropy code length calculating unit 24, a buffer 25, an IDCT (inverse DCT) unit 26, and a dequantizing unit 27.

On the other hand, the main encoding unit 3 is a module for performing main encoding and includes an intra-screen prediction processing unit 31, a DCT unit 32, a quantizing unit 33, an entropy encoding unit 34, a buffer 35, an IDCT unit 36, and a dequantizing unit 37.

The code quantity control unit 4 is a module for performing code quantity control.

In the image encoding device 100, an externally-supplied input image 91 is supplied to the first encoding unit 1 and the delay buffers 5 and 6. The first encoding unit 1 roughly estimates generated code quantities for respective quantization parameters QP. In the first encoding unit 1, the supplied input image 91 is supplied to the activity calculating unit 16 and the intra-screen prediction mode determining unit 11. The activity calculating unit 16 sorts MBs into activity groups in accordance with the complexity of the image. The activity calculating unit 16 supplies activity group numbers to the quantizing unit 14 and the code quantity control unit 4.

When being supplied with the input image 91, the intra-screen prediction mode determining unit 11 executes an intra-screen prediction process on the input image 91 to generate difference image data. Additionally, the intra-screen prediction mode determining unit 11 simplifies the intra-screen prediction process in the first pre-encoding unit 1 by using the input image 91 as a predictive image. The intra-screen prediction mode determining unit 11 determines the intra-screen prediction mode to be used in the main encoding unit 3 on the basis of a generated code quantity of the difference image data and supplies the determined intra-screen prediction mode to the intra-screen prediction processing units 12, 21, and 31.

The intra-screen prediction processing unit 12 generates difference image data from the input image 91 using the intra-screen prediction mode determined by the intra-screen prediction mode determining unit 11 and supplies the difference image data to the DCT unit 13. The DCT unit 13 performs a DCT process on the difference image data, generates DCT coefficients, and supplies the DCT coefficients to the quantizing unit 14.

The quantizing unit 14 executes quantization in parallel with a plurality of quantization steps using selected quantization parameters QPl that are discretely selected from among quantization parameters QP composed of 0 to 51. For example, the quantizing unit 14 includes n stages of quantizing units 14-1 to 14-n connected in parallel, and executes a quantization process on the basis of n selected quantization parameters QPl so as to generate n quantization coefficients. Additionally, the quantizing unit 14 regards the selected quantization parameters QPl as average quantization parameters BaseQP of the picture and executes quantization by adding an offset according to an activity group number supplied from the activity calculating unit 16. The detailed configuration of the quantizing unit 14 will be described below. The quantizing unit 14 supplies the n quantization coefficients to the CAVLC calculating unit 15.

The CAVLC calculating unit 15 executes a CAVLC process on the respective n quantization coefficients and supplies generated code quantities of respective MBs to the code quantity control unit 4.

Here, in the first pre-encoding unit 1, the input image 91 is used as a predictive image in place of a local decode image in the intra-screen prediction processing unit 12. On the other hand, in the main encoding unit 3, CAVLC and CABAC (Context-Adaptive Binary Arithmetic Coding) are executed as an entropy encoding method while being switched therebetween.

Therefore, the code quantity control unit 4 corrects generated code quantities using a statistical model calculated through statistics in advance. Accordingly, the code quantity control unit 4 can increase the precision of the generated code quantities calculated by the first pre-encoding unit 1. Furthermore, the code quantity control unit 4 calculates generated code quantities based on the quantization parameters other than the selected quantization parameters QPl with respect to the corrected generated code quantities based on the selected quantization parameters QPl. Hereinafter, the corrected generated code quantities based on the selected quantization parameters QPl and generated code quantities calculated through interpolation are collectively called low-precision generated code quantities. Accordingly, the code quantity control unit 4 does not need to execute quantization and a CAVLC process on all the quantization parameters QP, so that the circuit configuration of the quantizing unit 14 can be reduced and the processing load can be decreased.

The code quantity control unit 4 selects, as a predictive quantization parameter QPd, a quantization parameter QP in which a low-precision generated code quantity is the most approximate to the target code quantity. This predictive quantization parameter QPd is a rough value based on the low-precision generated code quantities that are calculated by the first pre-encoding unit 1 in a simple manner, and is a value in which it is predicted that a main encoding generated code quantity at main encoding is approximate to the target code quantity. Additionally, in a case where quantization matrixes Q Matrix are adaptively selected, the code quantity control unit 4 generates low-precision generated code quantities for the respective quantization matrixes Q Matrix and selects, as a predictive quantization matrix Q MatrixD, a quantization matrix Q Matrix that includes quantization parameters QP acceptable in the quantization matrix Q Matrix and that has a low-precision generated code quantity approximate to the target code quantity with the smallest tilt.

The second pre-encoding unit 2 determines a basic quantization parameter $QP_{MB}$ that is to be used in the main encoding unit 3. In the second pre-encoding unit 2, the input image 91 that is delayed and is supplied from the delay buffer 5 is supplied to the intra-screen prediction processing unit 21. The intra-screen prediction processing unit 21 encodes the input image 91 through intra-screen prediction using an intra-screen prediction mode supplied from the intra-screen prediction mode determining unit 11 to generate difference image data, and supplies the difference image data to the DCT unit 22.

The DCT unit 22 performs a DCT process on the difference image data to generate DCT coefficients and supplies the DCT coefficients to the quantizing unit 23. The quantizing unit 23 includes three stages of quantizing units 23-1, 23-2, and 23-3. The quantizing unit 23 generates quantization coefficients by quantizing the DCT coefficients on the basis of the predictive quantization parameter QPd and quantization parameters QP approximate to the predictive quantization parameter QPd and supplies the quantization coefficients to the entropy code length calculating unit 24. The entropy code length calculating unit 24 encodes the quantization coefficients using the encoding method used in the main encoding unit 3 among CAVLC and CABAC, thereby generating high-precision generated code quantities for the respective quantization parameters QP. On the basis of the high-precision generated code quantities generated by the entropy code length calculating unit 24, the code quantity control unit 4 determines the quantization parameter QP of the high-precision generated code quantity that is the most approximate to the target code quantity to be the basic quantization parameter $QP_{MB}$. The quantizing unit 23 supplies the quantization coefficients generated on the basis of the predictive quantization parameter QPd to the dequantizing unit 27. The dequantizing unit 27 dequantizes the quantization coefficients to generate DCT coefficients and supplies the DCT coefficients to the IDCT unit 26. The IDCT unit 26 performs an IDCT process on the DCT coefficients to generate a local decode image and supplies the image to the buffer 25. The buffer 25 supplies the local decode image to the intra-screen prediction processing unit 21. As a result, the intra-screen prediction processing unit 21 executes an intra-screen prediction process using the local decode image as a predictive image.

The second pre-encoding unit 2 uses the local decode image as a predictive image and executes entropy encoding using the same encoding method as that used in the main encoding unit 3, thereby being capable of calculating high-precision generated code quantities at higher precision than in the first pre-encoding unit 1. Then, on the basis of the high-precision generated code quantities, the code quantity control unit 4 can determine the quantization parameter QP predicted to generate a main encoding generated code quantity that is the most approximate to the target code quantity to be the basic quantization parameter $QP_{MB}$.

In the main encoding unit 3, the input image 91 that is delayed and is supplied from the delay buffer 6 is supplied to the intra-screen prediction processing unit 31. The intra-screen prediction processing unit 31 encodes the input image 91 through intra-screen prediction using an intra-screen prediction mode supplied from the intra-screen prediction mode determining unit 11 to generate difference image data, and supplies the difference image data to the DCT unit 32.

The DCT unit 32 performs a DCT process on the difference image data to generate DCT coefficients and supplies the DCT coefficients to the quantizing unit 23. The quantizing unit 33 quantizes the DCT coefficients on the basis of the basic quantization parameter $QP_{MB}$ to generate quantization coefficients and supplies the quantization coefficients to the entropy code length calculating unit 34. The entropy code length calculating unit 34 performs entropy encoding on the quantization coefficients using either of CAVLC and CABAC and supplies the coefficients as an output stream 92 to an external device.

The quantizing unit 33 supplies the quantization coefficients generated on the basis of the basic quantization parameter $QP_{MB}$ to the dequantizing unit 37. The dequantizing unit 37 dequantizes the quantization coefficients to generate DCT coefficients and supplies the DCT coefficients to the IDCT unit 36. The IDCT unit 36 performs an IDCT process on the DCT coefficients to generate a local decode image and supplies the local decode image to the intra-image prediction processing unit 31 via the buffer 35. The intra-screen prediction processing unit 31 executes an intra-screen prediction process using the local decode image as a predictive image.

In this way, the image encoding device 100 roughly estimates generated code quantities for respective quantization parameters QP as low-precision generated code quantities using the first pre-encoding unit 1, and determines a predictive quantization parameter QPd on the basis of the low-precision generated code quantities. The image encoding device 100 calculates high-precision generated code quantities at high precision using the predictive quantization parameter QPd and quantization parameters QP approximate thereto using the second pre-encoding unit 2. Then, the image encoding device 100 determines a basic quantization parameter $QP_{MB}$ on the basis of the high-precision generated code quantities calculated at high precision and uses the basic quantization parameter $QP_{MB}$ for a main encoding process performed by the main encoding unit 3. Accordingly, the image encoding device 100 can calculate high-precision generated code quantities in the basic quantization parameter $QP_{MB}$ at high precision without calculating generated code quantities based on all quantization parameters QP due to pre-encoding in two stages: the first pre-encoding unit 1 and the second pre-encoding unit 2. As a result, the image encoding device 100 can determine an appropriate basic quantization parameter $QP_{MB}$ with a simple configuration.

[1-2. Configurations of Conventional Quantizing Unit and CAVLC Calculating Unit]

Now, for deep understanding of the image encoding device 100 according to this embodiment, a description will be given about configurations and operations of a conventional quantizing unit and a conventional CAVLC calculating unit serving as a basis.

Figure 2:
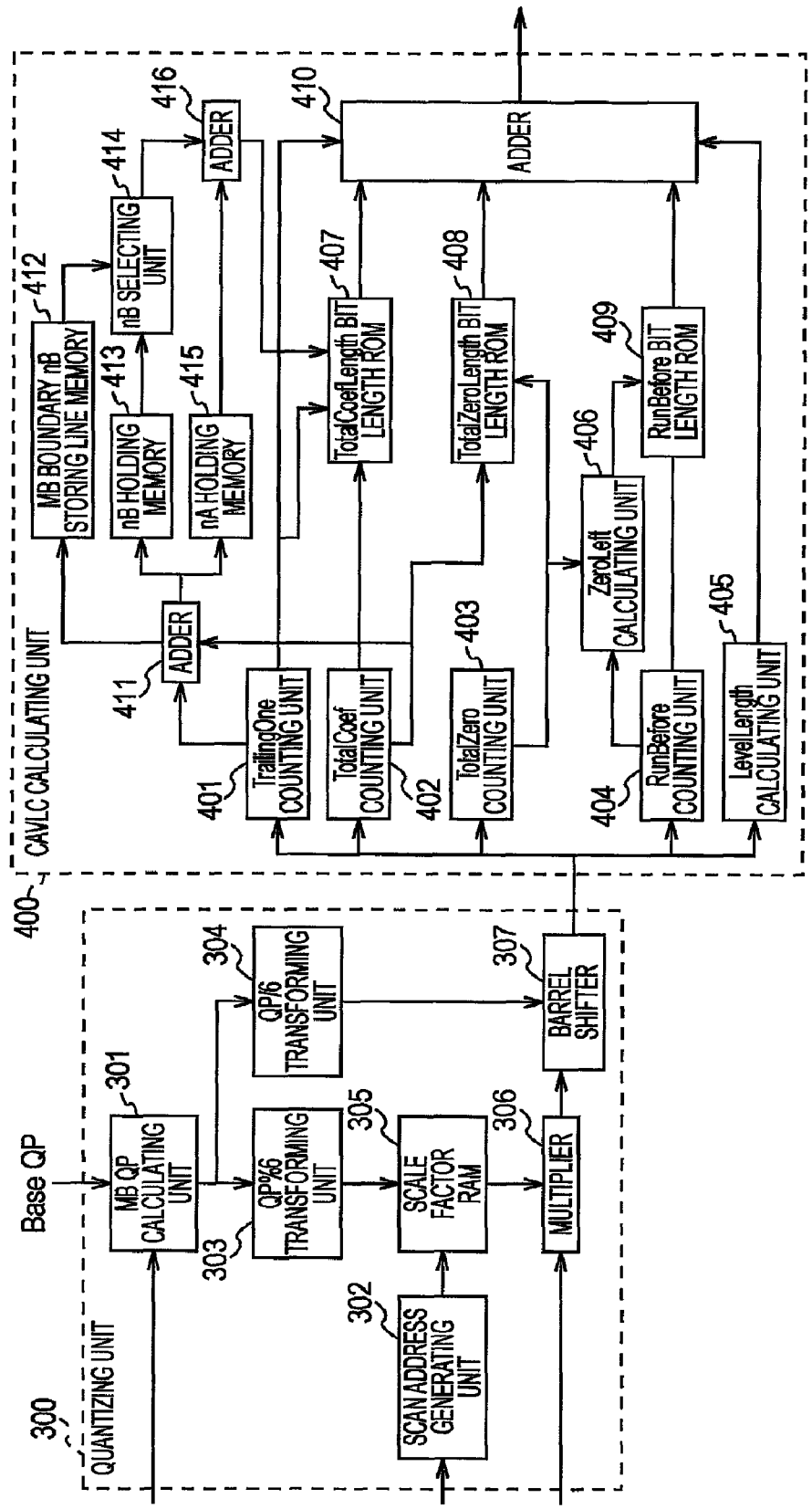
FIG. 2 is a configuration diagram of a quantizing unit and a CAVLC calculating unit of a conventional image encoding device.

FIG. 2 illustrates and describes configurations of a conventional quantizing unit 300 and a conventional CAVLC calculating unit 400. There are arranged quantizing units 300 and CAVLC calculating units 400 the number of which is the same as the number of selected quantization parameters QPl. Each pair of a quantizing unit 300 and a CAVLC calculating unit 400 calculates a generated code quantity based on one selected quantization parameter QPl.

The quantizing unit 300 includes an MB QP calculating unit 301, a scan address generating unit 302, a QP %6 transforming unit 303, a QP/6 transforming unit 304, a scale factor RAM (Random Access Memory) 305, a multiplier 306, and a barrel shifter 307.

On the other hand, the CAVLC calculating unit 400 includes a TrailingOne counting unit 401, a TotalCoef counting unit 402, a TotalZero counting unit 403, a RunBefore counting unit 404, a LevelLength calculating unit 405, a ZeroLeft calculating unit 406, a TotalCoefLength bit length ROM (Read Only Memory) 407, a TotalZeroLength bit length ROM 408, a RunBefore bit length ROM 409, adders 410, 411, and 416, an MB boundary nB storing line memory 412, an nB holding memory 413, an nA holding memory 415, and an nB selecting unit 414.

The quantizing unit 300 calculates a quantization coefficient Z using the following equation with use of a DCT coefficient W and a quantization parameter QP.

$$Z=\{(MF*16/Q\text{Matrix})*W+f\}>>(15+QP/6)$$

Here, MF is a scaling factor calculated from a value defined by a standard of AVC, and f is a rounding factor for determining a round-up or round-down position.

In this configuration, the following signals are input to the quantizing unit 300.

AFF signal indicating whether a macro block has a field structure or a frame structure 8×8/4×4 signal indicating which of 8×8 DCT and 4×4 DCT is to be used for orthogonal transformation Activity group DCT coefficients as a result of DCT Here, "activity group" is supplied as offset information of quantization of respective macro blocks with respect to an average quantization parameter Base QP, which is a base of an entire picture. "DCT coefficients" are supplied in an order appropriate for encoding (e.g., in a reverse order of scan).

The MB QP calculating unit 301 calculates an adaptive quantization parameter QPt, which is obtained by offsetting activities in units of MBs from activity groups and the average quantization parameter Base QP (selected quantization parameter QPl that is set). The QP %6 transforming unit 303 outputs a remainder generated by dividing the adaptive quantization parameter QPt by "6" (i.e., any of six values of 0, 1, 2, 3, 4, and 5) and supplies the remainder to the scale factor RAM 305 and the QP/6 transforming unit 304.

An AFF signal and an 8×8/4×4 signal are input to the scan address generating unit 302. The scan address generating unit 302 generates DCT addresses indicating the input position of a DCT coefficient on the basis of the AFF signal and the 8×8/4×4 signal and supplies the DCT addresses to the scale factor RAM 305.

The scale factor RAM 305 holds a multiplication coefficient obtained from the following equation.

$$\text{Multiplication coefficient}=16\times MF(8\times8/4\times4,QP,h,v)/Q\text{Matrix}(8\times8/4\times4,h,v)$$

Here, h and v are DCT addresses indicating the horizontal and vertical directions in a DCT coefficient, and vary in the range from 0 to 7 in 8×8 and in the range from 0 to 3 in 4×4. MF is a scaling factor, which is a constant parameter defined by H.264. Also, the quantization matrix Q Matrix is a parameter that can be set at an encoder. That is, the scale factor RAM 305 holds a value calculated by multiplying a DCT block size (8×8/4×4), the value of the adaptive quantization parameter QPt, and the scaling factor MF that changes in accordance with DCT addresses by "16" and dividing the product by the quantization matrix Q Matrix (MF*16/Q Matrix). The scale factor RAM 305 outputs a multiplication coefficient having an adaptive scan position phase to the multiplier 306 on the basis of the DCT addresses.

When supplied with an adaptive quantization parameter QPt from the MB QP calculating unit 301, the QP/6 transforming unit 304 outputs a result of dividing the adaptive quantization parameter QPt by an integer to the barrel shifter 307. The barrel shifter 307 adds "15" to the QP/6 transforming unit 304 to calculate a shift quantity and supplies the shift quantity to the CAVLC calculating unit 400. An output of the quantizing unit 300, which is a result of the multiplier 306 shifted by the barrel shifter 307, is equivalent to that obtained by executing quantization (division).

By receiving the output of the quantizing unit 300, the CAVLC calculating unit 400 calculates a generated code quantity that is obtained when actual encoding is executed.

The CAVLC calculating unit 400 encodes TotalCoef representing the number of nonzero coefficients, TrailingOne and trailing_ones_sign_flag representing the number and sign of coefficients having an absolute value of 1 sequentially arranged at the last, level representing the value of a DCT coefficient, total_zero representing the number of zero coefficients before the last nonzero coefficient, and run_before representing the number of zeros sequentially arranged before a nonzero DCT coefficient, and calculates the code lengths thereof. At this time, the CAVLC calculating unit 400 executes adaptive encoding on TotalCoef representing the number of nonzero coefficients and TrailingOne representing the number and sign of coefficients having an absolute value of 1 sequentially arranged at the last, in accordance with the state of surrounding 4×4 blocks. The CAVLC calculating unit 400 selects a VLC table for each 4×4 block on the basis of an addition value of TotalCoef and TrailingOne.

The TrailingOne counting unit 401 counts the number of values of 1 or −1 sequentially arranged from the top except zero among input values of 16 samples in a 4×4 block in a reverse scan order, and supplies the number as TrailingOne to the adder 411 and the TotalCoefLength bit length ROM 407. The TotalCoef counting unit 402 counts the number of nonzero coefficients that are not counted by the TrailingOne counting unit 401 and supplies the number as TotalCoef to the adder 411, the TotalCoefLength bit length ROM 407, and the TotalZeroLength bit length ROM 408. The TotalCoefLength bit length ROM 407 adaptively selects VLC tables in units of 4×4 blocks in accordance with a result from the adder 416 to encode TotalCoef and TrailingOne, and supplies the code lengths thereof to the adder 410.

The TotalZero counting unit 403 counts the number of zero coefficients except zeros sequentially arranged at the top and supplies the number as total_zero to the TotalZeroLength bit length ROM 408 and the ZeroLeft calculating unit 406. The TotalZeroLength bit length ROM 408 calculates a code length of total_zero and TotalCoef as the combination thereof and supplies the code length to the adder 410.

The Runbefore counting unit 404 sequentially counts the number of zeros sequentially arranged next to the nonzero coefficients (±1) counted by the TrailingOne counting unit 401 and the number of zeros sequentially arranged next to the nonzero coefficients counted by the TotalCoef counting unit 402, and supplies the numbers to the ZeroLeft calculating unit 406.

The ZeroLeft calculating unit 406 sequentially subtracts sequential numbers of zerorun of the Runbefore counting unit 404 from total_zero of the TotalZero counting unit 403, thereby accumulating Zero Left, which is the number of remaining zeros. The Runbefore bit length ROM 409 obtains a code length for encoding Runbefore as a combination of Zero Left and Runbefore.

Then, the LevelLength calculating unit 405 calculates the code length of nonzero DCT coefficients.

Adaptive selection of VLC tables in the TotalCoefLength bit length ROM 407 is executed on the basis of TotalCoef and TrailingOne. The adder 411 adds TrailingOne supplied from the TrailingOne counting unit 401 and TotalCoef supplied from the TotalCoef counting unit 402 to calculate the total number of nonzero coefficients. A VLC table is selected on the basis of the number nA of nonzero coefficients in a left-adjoining 4×4 block and the number nB of nonzero coefficients in an upper-adjoining 4×4 block. The adder 411 accumulates the numbers of nonzero coefficients in necessary 4×4 blocks in the nB holding memory 413 and the nA holding memory 415 in order to refer to the numbers as nA and nB.

Also, MBs are sequentially supplied in a line direction and 4×4 blocks are scanned in a predetermined order (raster scan order in an 8×8 sub-block) in the MBs. Therefore, a left-adjoining 4×4 block is scanned almost immediately previously. Likewise, an upper-adjoining block in an MB is scanned almost immediately previously. However, in a 4×4 block at the upper end of an MB, it is necessary to refer to a 4×4 block at the lowermost end in an MB in the preceding line in order to refer to an upper-adjoining block. Therefore, the adder 411 accumulates the values for macro block lines in the MB boundary nB storing line memory 412. On the basis of the address of a 4×4 block in an MB, the nB selecting unit 414 selects nB that is positioned at an upper portion and that is held in the MB boundary nB storing line memory 412 in a case of an upper boundary, and selects nB that is positioned at an upper portion from the nB holding memory 413 in the other cases. Then, the adder 416 regards an average value of nonzero coefficients in left-adjoining and upper-adjoining 4×4 blocks as a table selection index nC and calculates the table selection index nC in accordance with the following equation.

$$nC=(nA+nB)/2$$

Then, the adder 410 adds the values supplied from the TrailingOne counting unit 401, the TotalCoefLength bit length ROM 407, the TotalZeroLength bit length ROM 408, the RunBefore bit length ROM 409, and the LevelLength calculating unit 405, thereby obtaining the total sum of code lengths.

The above-described process is repeatedly performed on an entire picture in units of 4×4 blocks, so that a low-precision generated code quantity of the picture corresponding to the average quantization parameter Base QP is obtained. This process of obtaining the low-precision generated code quantity of the picture is performed in 15 stages in parallel by using different discretely-selected quantization parameters QPl as average quantization parameters Base QP, and is performed for respective quantization matrixes Q Matrix.

[1-3. Configurations of Quantizing Unit and CAVLC Calculating Unit According to this Embodiment]

Figure 3:
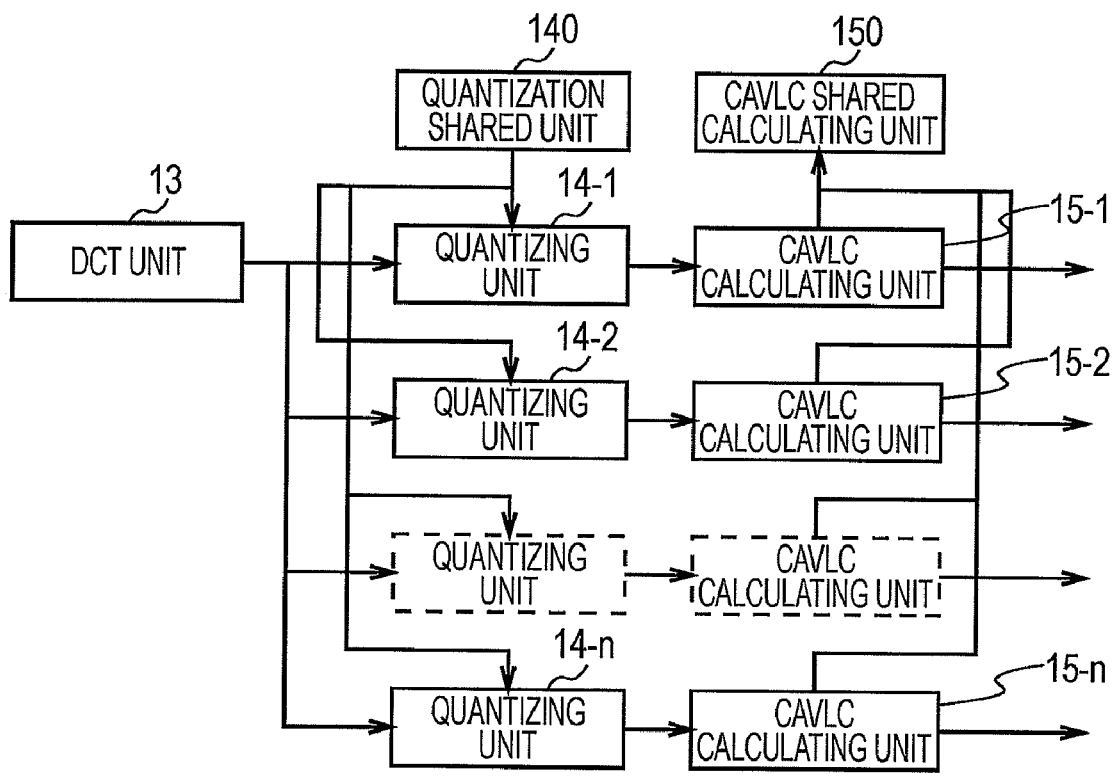
FIG. 3 is a diagram illustrating a basic configuration of a quantizing unit and a CAVLC calculating unit.
Figure 4:
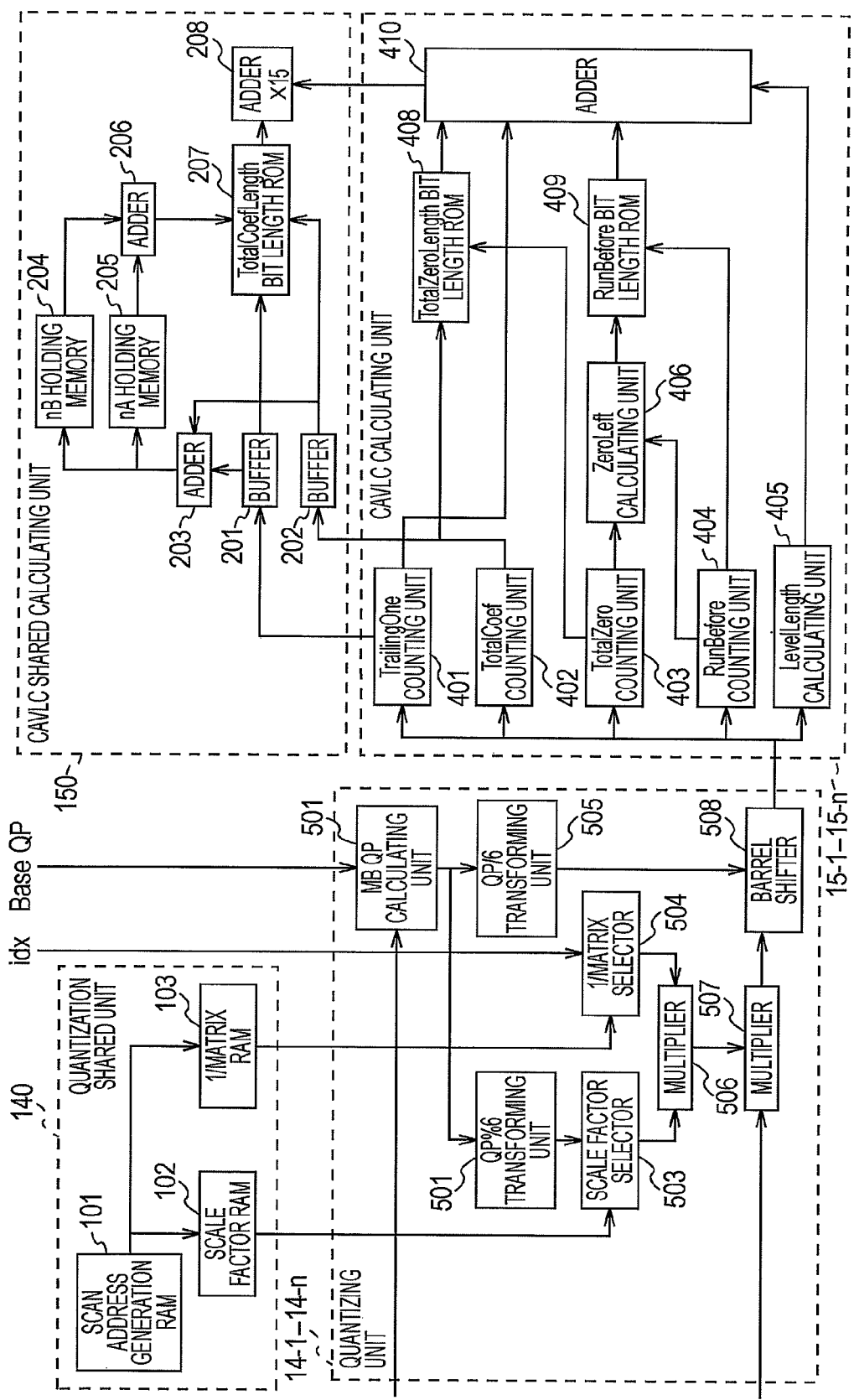
FIG. 4 is a configuration diagram specifically illustrating a quantizing unit and a CAVLC calculating unit of the image encoding device according to the first embodiment of the present invention.

FIGS. 3 and 4 illustrate and describe an extracted part of the configuration of the image encoding device 100 according to an embodiment of the present invention, with a characteristic process being added to the configuration illustrated in FIG. 2 described above. Note that the parts corresponding to those in the conventional CAVLC calculating unit 400 illustrated in FIG. 2 are denoted by the same reference numerals and that a description about the same parts will be omitted.

The image encoding device 100 and image encoding method according to this embodiment have the following characteristics.

In a case where a generated code quantity is predicted in a preprocess using an image compression method represented by H.264/AVC (Advanced Video Coding: advanced moving image compression coding standard) or the like, a process is simplified when quantization is performed in parallel in different quantization steps to calculate a code length, whereby hardware is reduced. This configuration has the following three characteristics.

A CAVLC shared calculating unit 150 of the CAVLC calculating unit 15 calculates a code quantity without using the number nB of nonzero coefficients in a 4×4 block at the upper end of an MB, whereby a line memory is reduced.

A CAVLC shared calculation process in which computation is performed in units of 4×4 blocks is shared in a time-sharing manner, whereby a logical module such as a code-length transform memory is reduced.

A selection process and a quantization process of scaling factors and quantization matrixes Q Matrix are separated by the quantization shared unit 140, so that a memory is shared and the memory is reduced.

FIG. 3 illustrates configurations of the quantizing unit 14 and the code-length calculating unit 15. The quantizing unit 14 is provided with quantizing units 14-1 to 14-*n* in parallel, the number of which is the same as the number of selected quantization parameters QPl, and the quantization shared unit 140 shared by the quantizing units 14-1 to 14-*n* is connected to each of the quantizing units 14-1 to 14-*n*. Likewise, the CAVLC calculating unit 15 is provided with CAVLC calculating units 15-1 to 15-*n* in parallel, the number of which is the same as the number of selected quantization parameters QPl, and the CAVLC shared calculating unit 150 shared by the CAVLC calculating units 15-1 to 15-*n* is connected to each of the CAVLC calculating units 15-1 to 15-*n*.

FIG. 4 is a block diagram of a main part for performing quantization and variable-length encoding using a plurality of quantization parameters QP. Note that the operation of the image encoding device 100 is also applied to the image encoding method according to this embodiment.

As illustrated in FIG. 4, the quantization shared unit 140 includes a scan address generating RAM 101, a scale factor RAM 102, and a 1/matrix RAM 103.

Each of the quantizing units 14-1 to 14-*n* includes an MB QP calculating unit 501, a QP %6 transforming unit 502, a scale factor selector 503, a 1/matrix selector 504, QP/6 transforming ROM 505, multipliers 506 and 507, and a barrel shifter 508.

The CAVLC shared calculating unit 150 includes buffers 201 and 202, an adder 203, an nB holding memory 204, an nA holding memory 205, an adder 206, a TotalCoefLength bit length ROM 207, and an adder 208.

Also, each of the CAVLC calculating units 15-1 to 15-*n* includes the TrailingOne counting unit 401, the TotalCoef counting unit 402, the TotalZero counting unit 403, the RunBefore counting unit 404, the LevelLength calculating unit 405, the ZeroLeft calculating unit 406, the TotalZeroLength bit length ROM 408, the RunBefore bit length ROM 409, and the adder 410.

As described above, the image encoding device 100 has a configuration of using the quantization shared unit 140 and the CAVLC shared calculating unit 150 that are shared to reduce the circuit scale of a parallelized process.

In the quantization shared unit 140, the scale factor RAM 102 and the 1/matrix RAM 103 are mainly shared to reduce an SRAM size. In the CAVLC shared calculating unit 150, code-length calculation by the TotalCoefLength bit length ROM 207 may be performed once for a 4×4 block, while other processes are executed in units of pixels, and thus the circuit is shared to perform a time-sharing process.

Also, the CAVLC calculating unit 15 approximately calculates a code quantity under the assumption nB=nA on the MB upper boundary to reduce the MB boundary nB storing line memory 412 illustrated in FIG. 3. Defining nB=nA is an approximation process and is a cause of error, but is within the allowance in a process of predicting a code quantity. Also, a reduction effect of a 15-parallel line memory obtained through this approximation is great.

In this configuration, an AFF signal indicating whether an MB has a field structure or a frame structure and an 8×8/4×4 signal indicating which of 8×8 DCT and 4×4 DCT is to be used for orthogonal transformation are input to the quantization shared unit 140. More specifically, the scan address generation RAM 101 generates DCT addresses indicating an input position of a DCT coefficient upon input of the AFF signal and the 8×8/4×4 signal.

The scale factor RAM 102 outputs a scaling factor MF having an adaptive scan position phase to the scale factor selector 503 of the quantizing unit 500. As described above, a scaling factor MF is selected in accordance with DCT addresses and the value of QP %6 (the remainder generated by dividing a selected quantization parameter QPl by 6). In the respective quantizing units 14-1 to 14-*n*, selected quantization parameters QPl different from each other are set as average quantization parameters BaseQP. Therefore, the scale factor RAM 102 outputs all the scaling factors MF corresponding to all six values (QP %6=0, 1, 2, 3, 4, and 5) in accordance with DCT addresses and causes the scale factor selectors 503 in the quantizing units 14-1 to 14-*n* in the subsequent stage to select the scaling factors MF. Likewise, the 1/matrix RAM 103 outputs, to the 1/matrix selectors 504 of the quantizing units 14-1 to 14-*n*, a reciprocal of a matrix value having an adaptive scan position phase among quantization matrixes Q Matrix. The 1/matrix RAM 103 carries the reciprocal of the matrix value by shift to the left of about 20 bits in order to output the reciprocal of the matrix value.

That is, the quantization matrix Q Matrix to be used changes depending on the value of the selected quantization parameter QPl, and thus a plurality of (e.g., about four types of) quantization matrixes Q Matrix are necessary. The 1/matrix RAM 103 outputs all the types of (four types of) reciprocals of matrix values to the 1/matrix selectors 504 of the quantizing units 14-1 to 14-*n* and causes the 1/matrix selectors 504 of the quantizing units 14-1 to 14-*n* in the subsequent stage to select the reciprocals in accordance with the value of the selected quantization parameter QPl that is set.

Subsequently, in each of the quantizing units 14-1 to 14-*n*, sequentially-supplied DCT coefficients are supplied to the MB QP calculating unit 501. The MB QP calculating unit 501 adds an activity offset according to an activity group to a selected quantization parameter QPl to generate an adaptive quantization parameter QPt and supplies it to the QP %6 transforming unit 501 and the QP/6 transforming unit 505. The QP %6 transforming unit 501 calculates a QP %6 value, which is a remainder generated by dividing the adaptive quantization parameter QPt by "6", and supplies it to the scale factor selector 503. The scale factor selector 503 selects a scaling factor MF as a first multiplication counting in accordance with the QP %6 value and supplies it to the multiplier 506. The 1/matrix selector 504 selects a reciprocal of a matrix value as a second multiplication counting on the basis of a matrix identification number idx of the quantization matrix Q Matrix to be used and supplies it to the multiplier 506.

The multiplier 506 multiplies the scaling factor MF by "16" and the reciprocal of the matrix value (MF*16/QMatrix). The multiplier 506 performs multiplication of output values of the scale factor selector 503 and the 1/matrix selector 504 and then performs shift to the right of 20 bits so as to achieve matching for carry in the 1/matrix RAM 103, and supplies the multiplication value to the multiplier 507. The multiplier 507 multiplies DCT coefficients in a scan reverse order by the multiplication value and supplies the products to the barrel shifter 508. The QP/6 transforming unit supplies a QP/6 value generated by dividing the adaptive quantization parameter QPt by "6" to the barrel shifter 508. The barrel shifter 508 decreases the digits of the output value of the multiplier 507 by the number of digits according to the QP/6 value, thereby obtaining a quantization result.

In this way, the scale factor RAM and the 1/matrix RAM 103 are shared in the quantizing unit 14, and all scaling factors MF and reciprocals of matrix values that are acceptable in the quantizing units 14-1 to 14-$n$ in the subsequent stage are supplied to the quantizing units 14-1 to 14-$n$ in accordance with DCT addresses. Each of the quantizing units 14-1 to 14-$n$ selects a scaling factor MF in accordance with a selected quantization parameter QPl. Also, each of the quantizing units 14-1 to 14-$n$ selects a reciprocal of a matrix value in accordance with a matrix identification number idx. Accordingly, the scale factor RAM 102 and the 1/matrix RAM 103 can be shared in the quantizing unit 14, so that the capacity of the RAM necessary for the entire quantizing unit 14 can be reduced. Also, the quantizing unit 14 holds scaling factors MF and reciprocals of matrix values separately from each other. Therefore, the storage capacity necessary for the scale factor RAM 102 and the 1/matrix RAM 103 can be reduced compared to a case of holding all values of products of scaling factors MF and reciprocals of matrix values.

The CAVLC calculating unit 15 is different from the conventional CAVLC calculating unit 400 in that the CAVLC shared calculating unit 150 adaptively selects VLC tables and encodes TrailingOne and TotalCoef.

The TrailingOne counting unit 401, the TotalCoef counting unit 402, the TotalZero counting unit 403, the RunBefore counting unit 404, the LevelLength calculating unit 405, the ZeroLeft calculating unit 406, the TotalZeroLength bit length ROM 408, and the RunBefore bit length ROM 409 in each of the CAVLC calculating units 15-1 to 15-$n$ sequentially execute a process on DCT coefficients supplied thereto. That is, the respective units in each of the CAVLC calculating units 15-1 to 15-$n$ execute 4×4=16 times of computation on a 4×4 DCT block. In contrast, the TotalCoefLength bit length ROM 407 only needs to select one VLC table and perform computation once on TrailingOne and TotalCoef calculated for a 4×4 DCT block. That is, the TotalCoefLength bit length ROM 407 needs a computation time of only about one sixteenth relative to the respective units in each of the CAVLC calculating units 15-1 to 15-$n$. Thus, the CAVLC shared calculating unit 150 holds TrailingOnes and TotalCoefs supplied from the CAVLC calculating units 15-1 to 15-$n$ in the buffers 201 and 202, respectively. While the respective units in each of the CAVLC calculating units 15-1 to 15-$n$ execute a process on the next 4×4 block, the CAVLC shared calculating unit 150 adaptively selects a VLC table for the preceding 4×4 block, and sequentially encodes fifteen TrailingOnes and TotalCoefs calculated by the CAVLC calculating units 15-1 to 15-$n$.

In the CAVLC shared calculating unit 150, the outputs of the TrailingOne counting units 401 and the TotalCoef counting units 402 of the 15-parallel CAVLC calculating units 15-1 to 15-$n$ are held in fifteen stages of buffers in each of the buffers 201 and 202.

The adder 203 receives TrailingOnes and TotalCoefs from the buffers 201 and 202 in a time-sharing manner and adds the TrailingOnes and TotalCoefs to calculate the numbers of nonzero coefficients. The nA holding memory 205 holds the number nA of nonzero coefficients of a 4×4 block referred to as a left-adjoining block in a macro block. The nB holding memory 204 holds the number nB of nonzero coefficients of a 4×4 block referred to as an upper-adjoining block in a macro block of 4×4 blocks.

Here, the CAVLC shared calculating unit 150 normally needs to hold nB information of an MB lower boundary and use it as nB information of a 4×4 block on an upper boundary of a lower macro block. However, if a 15-stage line memory for holding nB is arranged in the CAVLC shared calculating unit 150, the storage capacity of the RAM required for the CAVLC shared calculating unit 150 becomes large, which is undesirable in view of the circuit scale. Therefore, when processing a 4×4 block on an MB upper boundary, the CAVLC shared calculating unit 150 performs the same process as a macro block process at the uppermost portion of the screen by equating nB with nA.

That is, in a case where a 4×4 block is on the upper boundary of an MB, the adder 206 sets the table selection index nC to nA. The adder 206 sets nC to nB for a 4×4 block on the left boundary of the screen. In a case other than the foregoing two cases, that is, in a case where a 4×4 block is neither on the upper boundary of an MB nor on the left boundary of the screen, the adder 206 sets nC to (nA+nB)/2. Then, the TotalCoefLength bit length ROM 207 selects a VLC table on the basis of the table selection index nC, encodes TrailingOne and TotalCoef, and calculates the code lengths thereof. As a result, the TotalCoefLength bit length ROM 207 sequentially outputs TotalCoefLength bit lengths to the adder 208. The adder 208 is supplied with the code lengths calculated by the CAVLC calculating units 15-1 to 15-$n$. The adder 208 adds the codes that correspond to the TotalCoefLength bit lengths and that are supplied from the CAVLC calculating units 15-1 to 15-$n$ and the TotalCoefLength bit lengths, thereby calculating the code lengths of respective 4×4 blocks. The code quantity control unit 4 adds the code lengths of the respective 4×4 blocks in units of MBs, thereby calculating generated code quantities of the respective MBs. These processes are repeatedly performed on the entire picture.

In this way, in the CAVLC calculating unit 15, the TotalCoefLength bit length ROM 207, in which the number of computations is small, is shared. Accordingly, in the CAVLC calculating unit 15, the number of TotalCoefLength bit length ROMs 207 can be reduced and the circuit configuration can be simplified. The CAVLC calculating unit 15 sets the table selection index nC to nA in a case where a 4×4 block is on the upper boundary of an MB. Accordingly, an MB boundary nB storing line memory can be omitted in the CAVLC calculating unit 15, the storage capacity of the RAM required for the CAVLC calculating unit 15 can be significantly reduced, and the circuit configuration can be simplified.

According to the above-described image encoding device 100 and image encoding method according to an embodiment, the quantizing unit 14 stores scaling factors MF and 1/Q Matrix separately from each other and supplies all values acceptable in accordance with DCT addresses to the respective quantizing units 14-1 to 14-$n$. Each of the quantizing units 14-1 to 14-$n$ selects a scaling factor MF and a 1/Q matrix in accordance with a quantization parameter QP that is set. Accordingly, in the quantizing unit 14, a memory can be shared by the quantizing units 14-1 to 14-$n$ and thus the memory can be reduced. The CAVLC calculating unit 15 does not use an upper-adjoining 4×4 block at the upper end portion of an MB when selecting a VLC table, so that the MB boundary nB storing line memory 412 can be reduced. Furthermore, in the CAVLC calculating unit 15, the CAVLC shared calculating unit 15 in which computation is executed in units of 4×4 DCT blocks is shared in a time-sharing manner, so that the logical module can be reduced.

Also, the image encoding device 100 executes pre-encoding twice in units of pictures considering that the advantage of AVC cannot be maximized if the unit of process is small because the efficiency is enhanced by using an intra-screen correlation in AVC. Also, the image encoding device 100 employs, a partially-parallel configuration based on partial sharing of the circuit in order to overcome a problem in that a processing quantity increases, resulting in an increase in circuit scale of encoding, for the purpose of increasing efficiency. Accordingly, the image encoding device 100 is capable of causing a generated code quantity to match a target code quantity given to one picture and determining a code quantity distribution in view of a visual characteristic, that is, quantization parameters QP, while simplifying the configuration of pre-encoders.

Additionally, the present invention is not limited to the above-described embodiment, and various improvements and changes are acceptable without deviating from the intention of the invention.

For example, the above-described image encoding device and image encoding method can be carried out as a computer program loaded in the device or a recording medium carrying the program, and as a computer program for executing the method or a recording medium carrying the program.

Additionally, the above-described series of encoding processes can be executed by hardware and can be executed by software. In a case where the encoding processes are realized by software, the image encoding device 100 is virtually formed in a CPU or a RAM. Then, an encoding program stored in a ROM is expanded in a RAM, whereby the encoding processes are executed.

[1-4. Process Procedure]

Figure 5:
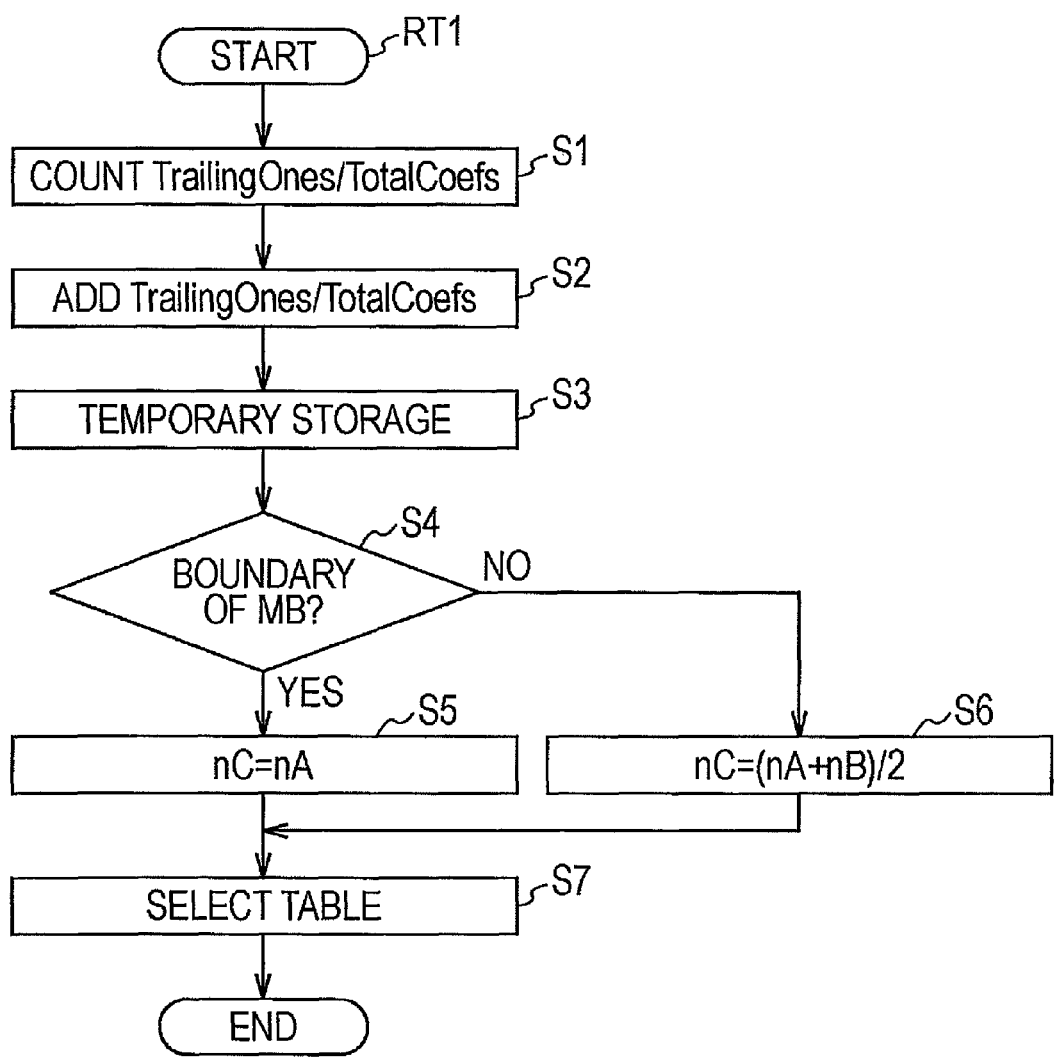
FIG. 5 is a flowchart illustrating a VLC table selecting process procedure.

Next, a description will be given with reference to the flowchart illustrated in FIG. 5 about a VLC table selection process procedure RT1 executed by the CAVLC shared calculating unit 150 in accordance with an encoding program.

The CAVLC calculating unit 15 starts the VLC table selection process procedure RT1 when being supplied with DCT coefficients from the quantizing unit 14, and moves to step S1. The CAVLC calculating unit 15 counts, by the CAVLC calculating units 15-1 to 15-$n$, TrailingOnes and TotalCoefs, and then moves to the next step S2.

In step S2, the CAVLC calculating unit 15 adds the TrailingOnes and TotalCoefs to calculate the numbers of nonzero coefficients, and then moves to the next step S3.

In step S3, the CAVLC calculating unit 15 temporarily stores the numbers nA and nB of nonzero coefficients as a reference target, and then moves to the next step S4.

In step S4, the CAVLC calculating unit 15 judges whether a 4×4 block as a process target is on an upper boundary of an MB. Here, if a negative result is obtained, this indicates that nB as a reference target is held in the nB holding memory 204. At this time, the CAVLC calculating unit 15 moves to the next step S6. In step S6, the CAVLC calculating unit 15 uses an average value of nA and nB as a table selection index nC, and then moves to the next step S7.

On the other hand, if a positive result is obtained in step S4, the CAVLC calculating unit 15 moves to step S5 and uses nA as the table selection index nC, and then moves to the next step S7.

In step S7, the CAVLC calculating unit 15 selects a VLC table on the basis of the table selection index nC, and moves to an end step to end the process.

[1-5. Operation and Effect]

In the above-described configuration, the image encoding device 100 is supplied with the input image 91 that is line-scanned in units of MBs as scan blocks, each constituted by a plurality of 4×4 blocks, while being scanned in units of 4×4 blocks as encoding blocks, each constituted by a plurality of pixels. The image encoding device 100 selects a VLC (variable length) table corresponding to a table selection index nC, which is an average value of the numbers nB and nA of nonzero coefficients as encoding values on which variable-length encoding is to be performed in upper-adjoining and left-adjoining 4×4 blocks of a 4×4 block as an encoding target in quantization coefficients as encoding target data based on the input image 91. At this time, in a case where the 4×4 block as an encoding target is at the upper end of an MB, the image encoding device 100 equates the number nB of nonzero coefficients of the upper-adjoining 4×4 block with the number nA of nonzero coefficients of the left-adjoining 4×4 block. The image encoding device 100 performs variable-length encoding on the number of nonzero coefficients of the 4×4 block as an encoding target in quantization coefficients using a selected VLC table.

Accordingly, in the image encoding device 100, a memory for one line for referring to the number nB of upper-adjoining nonzero coefficients at the upper end of an MB can be omitted, so that the circuit configuration can be simplified.

The image encoding device 100 encodes the input image 91 by quantizing it using quantization steps based on at least quantization factors (quantization parameters QP or a quantization matrix, or both of them), thereby generating quantization coefficients as encoding target data.

The image encoding device 100 determines a basic quantization parameter $QP_{MB}$ in which it is predicted that a main encoding generated code quantity obtained by performing main encoding on the input image 91 is the most approximate to the target code quantity on the basis of low-precision generated code quantities obtained through variable-length encoding performed on quantization coefficients. The image encoding device 100 performs main encoding on the input image 91 on the basis of the determined basic quantization parameter $QP_{MB}$.

Accordingly, the image encoding device 100 can determine the basic quantization parameter $QP_{MB}$ on the basis of low-precision generated code quantities calculated in a simple configuration.

The image encoding device 100 performs a DCT process, which is orthogonal transformation, on the input image 91 in units of 4×4 blocks and then quantizes the input image 91 using quantization steps based on quantization parameters QP to encode it, thereby generating quantization coefficients. The image encoding device 100 determines a predictive quantization parameter QPd as a predictive quantization factor approximate to the basic quantization parameter $QP_{MB}$. The image encoding device 100 encodes the input image 91 on the basis of the selected predictive quantization parameter QPd and quantization parameters QP approximate to the predictive quantization parameter QPd and calculates high-precision generated code quantities of the input image 91. The image encoding device 100 determines the basic quantization parameter $QP_{MB}$ on the basis of the calculated high-precision generated code quantities of the input image 91.

Accordingly, the image encoding device 100 can determine the basic quantization parameter $QP_{MB}$ on the basis of the predictive quantization parameter QPd that is highly possible to be the basic quantization parameter $QP_{MB}$ and quantization parameters QP approximate to the predictive quantization parameter QPd. Therefore, the image encoding device 100 can enhance the prediction precision of the basic quantization parameter $QP_{MB}$.

The image encoding device 100 encodes the input image 91 using a plurality of quantization steps based on a plurality of quantization parameters QP, thereby generating a plurality of quantization coefficients. The image encoding device 100 determines the basic quantization parameter $QP_{MB}$ on the basis of a plurality of low-precision generated code quantities obtained by performing variable-length encoding on the plurality of quantization coefficients.

Accordingly, the image encoding device 100 can enhance the prediction precision of the basic quantization parameter $QP_{MB}$.

The image encoding device 100 includes a plurality of counting units provided in parallel, the number of which is the same as the number of a plurality of quantization coefficients to be generated. Each of the plurality of counting units counts the number of nonzero coefficients, which are not zero, as an encoding value from a 4×4 block in quantization coefficients. The image encoding device 100 sequentially performs variable-length encoding on all the counted numbers of nonzero coefficients.

Accordingly, in the image encoding device 100, the Total-CoefLength bit length ROM 207 that performs variable-length encoding on the number of nonzero coefficients can be shared as the CAVLC shared calculating unit 150. That is, in the image encoding device 100, the counting units that require 4×4=16 times of computation for a 4×4 block are separated from the TotalCoefLength bit length ROM 207 that only needs to perform a process on a 4×4 block once, and the TotalCoefLength bit length ROM 207 is shared as the CAVLC shared calculating unit 150. Also, the image encoding device 100 time-shares the number of nonzero coefficients counted by fifteen counting units, for example, and the TotalCoefLength bit length ROM 207 sequentially performs variable-length encoding thereon. Accordingly, in the image encoding device 100, the number of TotalCoefLength bit length ROMs 207 can be reduced, so that the configuration of the CAVLC calculating unit 15 can be simplified.

The image encoding device 100 sequentially selects VLC tables corresponding to a plurality of quantization coefficients on the basis of all the numbers of nonzero coefficients counted by the plurality of counting units.

Accordingly, in the image encoding device 100, a circuit for adaptively selecting VLC tables (the buffers 201 and 202, the adders 203 and 206, the nB holding memory 204, and the nA holding memory 205) can be shared among the plurality of counting units. As a result, the image encoding device 100 requires only one circuit for adaptively selecting VLC tables, so that the configuration can be simplified.

The image encoding device 100 includes, as counting units, the TrailingOne counting unit 401 that counts TrailingOne, which is the number of values of 1 or −1 sequentially arranged, and the TotalCoef counting unit 402 that counts TotalCoef, which is the number of nonzero values not counted by the TrailingOne counting unit 401. The image encoding device 100 further includes, as a circuit for performing variable-length encoding, the buffer 201 that stores all TrailingOnes counted by the TrailingOne counting unit 401, the buffer 202 that stores all TotalCoefs counted by the TotalCoef counting unit 401, and the adder 203 that sequentially adds the TrailingOnes and TotalCoefs stored in the buffers 201 and 202, thereby sequentially calculating the numbers of nonzero counting.

In the image encoding device 100, the scale factor RAM 102 stores first multiplication coefficients (scaling factors MF) according to combinations of DCT addresses, which are positions in a 4×4 block, and quantization factors (quantization parameters QP), specifies scaling factors MF acceptable in accordance with all the quantization parameters QP from the DCT addresses of the 4×4 block, and outputs the specified scaling factors MF. In the image encoding device 100, multiplication coefficient selecting units (scale factor selectors 503) provided in parallel, the number of which is the same as a plurality of quantization coefficients, select scaling factors MF according to quantization parameters QP to be used from among the output scaling factors MF. In the image encoding device 100, the plurality of multipliers 507 provided in parallel, the number of which is the same as the number of a plurality of quantization coefficients, multiply selected multiplication coefficients by the value of a 4×4 block. In the image encoding device 100, the barrel shifters 508 as a plurality of shift units provided in parallel, the number of which is the same as a plurality of quantization coefficients, shift the values of quantization coefficients multiplied by the multipliers 507 to the right by the number of digits according to quantization factors.

Accordingly, in the image encoding device 100, the RAM for holding multiplication coefficients can be shared, so that the storage capacity of the RAM can be reduced.

In the image encoding device 100, the 1/matrix RAM 103 stores, as quantization factors, second multiplication coefficients (reciprocals of matrix values in quantization matrixes) according to combinations of quantization matrixes and positions of encoding blocks, specifies reciprocals of matrix values acceptable in accordance with all quantization matrixes Q Matrix from the DCT addresses of 4×4 blocks, and outputs the specified reciprocals of the matrix values. The image encoding device 100 selects a reciprocal of a matrix value according to a quantization matrix Q Matrix to be used from among the output reciprocals of the matrix values.

Accordingly, the image encoding device 100 may store combinations of quantization parameters QP and addresses of 4×4 blocks and combinations of quantization matrixes and addresses of 4×4 blocks separately from each other. Therefore, in the image encoding device 100, the total number of combinations to be stored can be reduced compared to the conventional scale factor RAM 305 that stores quantization parameters QP, addresses of 4×4 blocks, and multiplication coefficients according to quantization matrixes. As a result, the image encoding device 100 can reduce the storage capacity of the scale factor RAM 102 and the 1/matrix RAM 103.

According to the above-described configuration, the image encoding device 100 receives the input image 91 that is line-scanned in units of MBs and that is scanned in a raster scan order in which a 4×4 block is scanned in a Z-shape. As a result, the left-adjoining 4×4 block in which the number nA of nonzero coefficients is referred to is the 4×4 block before the preceding block at a maximum. In contrast, the upper-adjoining block in which the number nB of nonzero coefficients is referred to can be on the preceding MB line. When encoding a 4×4 block at the upper end of an MB in simple encoding, the image encoding device 100 equates the number nB of nonzero coefficients of the upper-adjoining 4×4 block with the number nA of nonzero coefficients of the left-adjoining 4×4 block, thereby being capable of reducing the memory for

2. Second Embodiment

A second embodiment illustrated in FIGS. 6 to 13 is different from the first embodiment in that a preceding mode estimation pre-encoding unit 40 is provided.

[2-1. Back Search]

The present invention relates to, for example, an image encoding device or the like, and specifically relates to a technical field of preventing degradation during dubbing and performing control to obtain a desired main encoding generated code quantity during main encoding.

Conventionally, when video data is transmitted between television broadcast stations or when copying of video data is performed using a plurality of video tape recorders (VTR devices), an encoder and a decoder need to be connected tandem in series because video data that is compressed and encoded using an MPEG (Moving Picture Experts Group) 2 method is decompressed and decoded, and is compressed and encoded again.

Then, a method that is so-called "back search" is employed as a method for reducing degradation in quality of video due to repetition of compression coding and decompression decoding at such tandem connection.

Here, "back search" is a method for obtaining a quantization step related to a minimum value as an optimum quantization step by using a characteristic in that the total sum of remainders of DCT (Discrete Cosine Transfer) coefficients is extremely small when a quantization step used in the preceding compression coding or a quantization step having a relationship of the multiple thereof is used.

Regarding a technique using this "back search", for example, Patent Document 2 discloses a video data compression device for preventing degradation in quality of video in a case where a quantization step in the preceding compression coding is reproduced using the back search method, where input video data is compression-coded again with the quantization step and GOP (Group of Picture) phase same as the preceding ones, and where compression coding and decompression decoding of video data are repeated by tandem connecting an encoder and a decoder.

In an encoding method using orthogonal transformation, such as the MPEG2, there is a method for reproducing or reusing a quantization value and an inter-predictive image (motion vector) as a method for preventing degradation during dubbing. On the other hand, in an H264 (AVC: Advanced Video Coding: advanced moving image compression coding standard) intra image, intra-frame prediction (intra prediction) is used, and degradation during dubbing can be prevented by reproducing Q Matrix in units of pictures, intra-screen prediction modes in units of DCT blocks, and quantization values in units of macro blocks.

Patent Document 2: Japanese Unexamined Patent Application Publication No. 10-174098

Additionally, in AVC Intra, if a quantization matrix Q Matrix and a quantization parameter QP used in the preceding encoding are used to decode again an image that is once encoded and decoded at decoding, quantization distortion is less likely to occur any more because quantization distortion has already been removed in the preceding encoding. Detecting the Q Matrix and QP used in the preceding encoding in this way at high probability is called "back search".

This back search has a process configuration of reproducing quantization values and parameters for improving a dubbing characteristic in an H.264/AVC (Advanced Video Coding: advanced moving image compression coding standard) image compression method and has the following characteristics, any of which is directed to reducing the circuit scale.

An input image, not a local decode image, is used as an intra prediction image.

A quantization level value is generated from a scale factor of a decoder.

QP of a macro block is determined on the basis of a remainder minimum condition and then a parameter of an intra-screen prediction mode is reproduced with the remainder minimum condition.

Additionally, a configuration of an encoding device that executes back search in accordance with AVC is described in Patent Document 3, for example.

Patent Document 3: International Application No. PCT/JP2008/066917

In addition to the foregoing configuration, the following configuration is used for further reduction of the circuit in this embodiment.

Only first-half coefficients in a DCT scan order are regarded as targets of a process.

A computation circuit for remainder values (corresponding to a remainder calculating unit described below) is approximated by subtractions of about ten stages.

Hereinafter, this embodiment will be described in detail in view of those characteristics.

Figure 6:
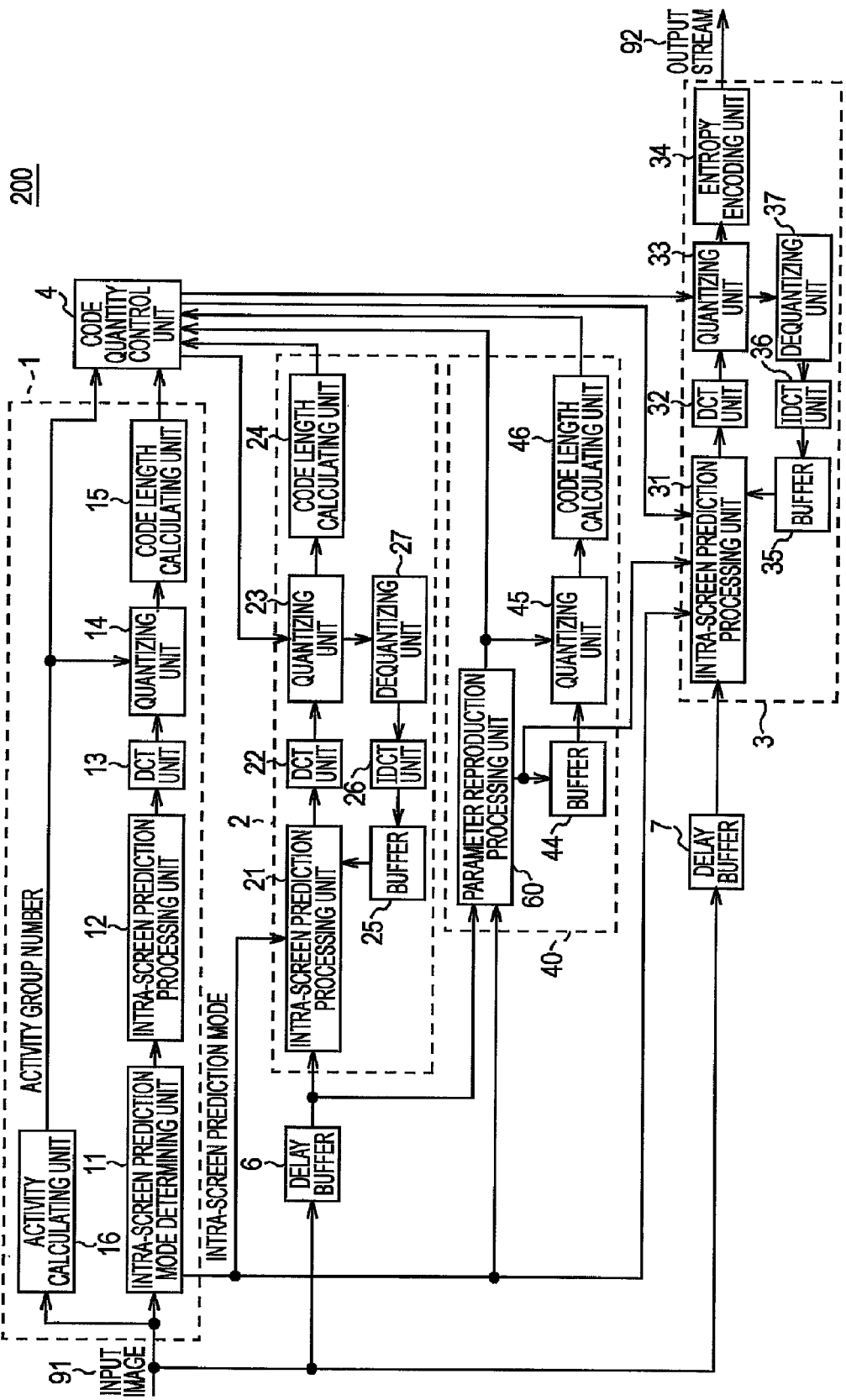
FIG. 6 is a configuration diagram of an image encoding device according to a second embodiment of the present invention.

FIG. 6 illustrates and describes a configuration of an image encoding device 200 according to an embodiment of the present invention.

The preceding mode estimation pre-encoding unit 40 is a module that performs pre-encoding for estimating a preceding mode and includes a parameter reproduction processing unit 60, a buffer 44, a quantizing unit 45, and an entropy code length calculating unit 46.

A code quantity control unit 4 is a module that performs code quantity control.

In the preceding mode estimation pre-encoding unit 40, the first to n-th candidates of intra-screen prediction modes that are determined in an ascending order of code quantity by the intra-screen prediction mode determining unit 11 are input to the parameter reproduction processing unit 60. The parameter reproduction processing unit 60 has a quantization parameter QP detection function and a detection function of an intra-screen prediction mode. The parameter reproduction processing unit 60 detects a quantization parameter QP used in the preceding encoding by using the quantization parameter QP detection function. Hereinafter, a quantization parameter QP that is detected is called a detected quantization parameter QPe. Specifically, the parameter reproduction processing unit 60 detects a detected quantization parameter QPe using remainders generated by dividing DCT coefficients in each MB by rescaling factors RF based on a plurality of quantization parameters QP. Then, the parameter reproduction processing unit 60 detects the intra-screen prediction mode that was used in the preceding encoding on the basis of the detected quantization parameter QPe by using the intra-screen prediction mode detection function. The details of this configuration are described in Patent Document 3. Note that, in this embodiment, only detection of a detected quantization parameter QPe and an intra-screen prediction mode is executed as back search and that detection of a detected quantization matrix Q MatrixE is not executed for reducing processes.

The quantizing unit 45 performs quantization using the detected quantization parameter QPe and the intra-screen prediction mode detected in back search on an MB in which back search has successfully been performed. The quantizing unit 45 uses a basic quantization parameter $QP_{MB}$, an activity group, and the first candidate of intra-screen prediction mode determined by the first pre-encoding unit 1 for an MB in which back search has not successfully been performed. The entropy code length calculating unit 46 selects the same method as that of entropy encoding of main encoding performed by the main encoding unit 3 from CABAC/CAVLC. The code quantity control unit 4 judges whether the back search generated code quantity obtained in this manner satisfies a target code quantity and determines which of an original image mode and a dubbing mode is to be used to perform encoding.

The code quantity control unit 4 determines which of the original image mode and the dubbing mode is to be used to perform encoding in accordance with a result of the preceding mode estimation pre-encoder 4 and determines a final encoding parameter (the details will be described below). The code quantity control unit 4 supplies, to the main encoding unit 3, a judgment result of the original image mode/dubbing mode, the basic quantization parameter $QP_{MB}$, the predictive quantization matrix Q MatrixD, the intra-screen prediction mode, and the activity group of each MB (hereinafter these are collectively called main encoding information). As a result, the main encoding unit 3 moves to either of the original image mode and the dubbing mode and performs encoding using the main encoding information according to the original image mode and the dubbing mode.

The main encoding unit 3 performs main encoding using the basic quantization parameter $QP_{MB}$, the predictive quantization matrix Q MatrixD, the activity group, etc. That is, when receiving a delayed input image via the delay buffer 6, the intra-screen prediction processing unit 31 calculates a difference image between a predictive image and the input image in the prediction mode determined in the first pre-encoding. At this time, the intra-screen prediction processing unit 31 uses the intra-screen prediction mode determined by the intra-screen prediction mode determining unit 11 if the mode is the original image mode, and uses the intra-screen prediction mode determined by the parameter reproduction processing unit 60 if the mode is the dubbing mode.

[2-2. Configuration of Parameter Reproduction Processing Unit]

Figure 7:
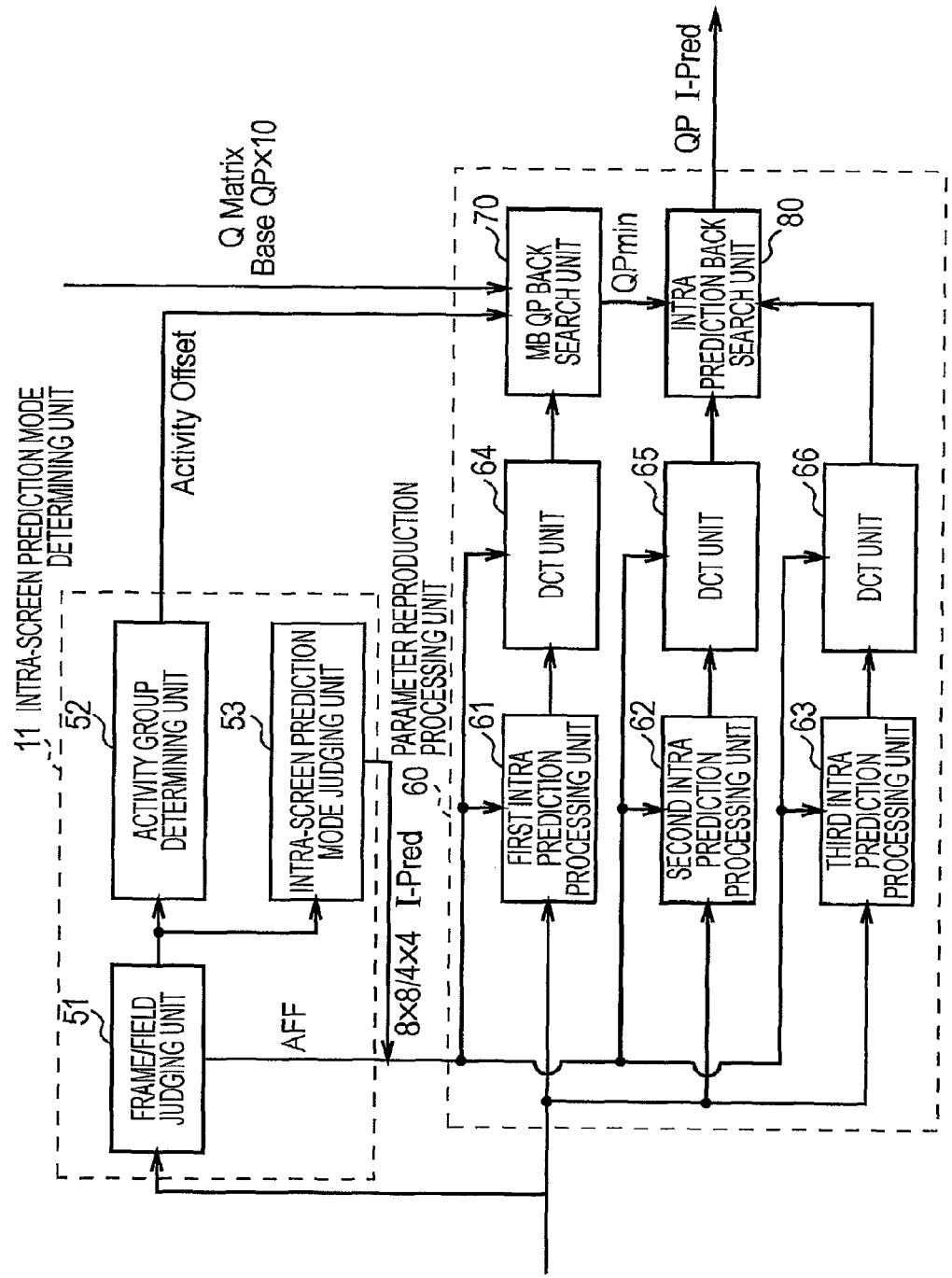
FIG. 7 is a detailed configuration diagram of a prediction mode determining unit and a parameter reproduction processing unit.
Figure 8:
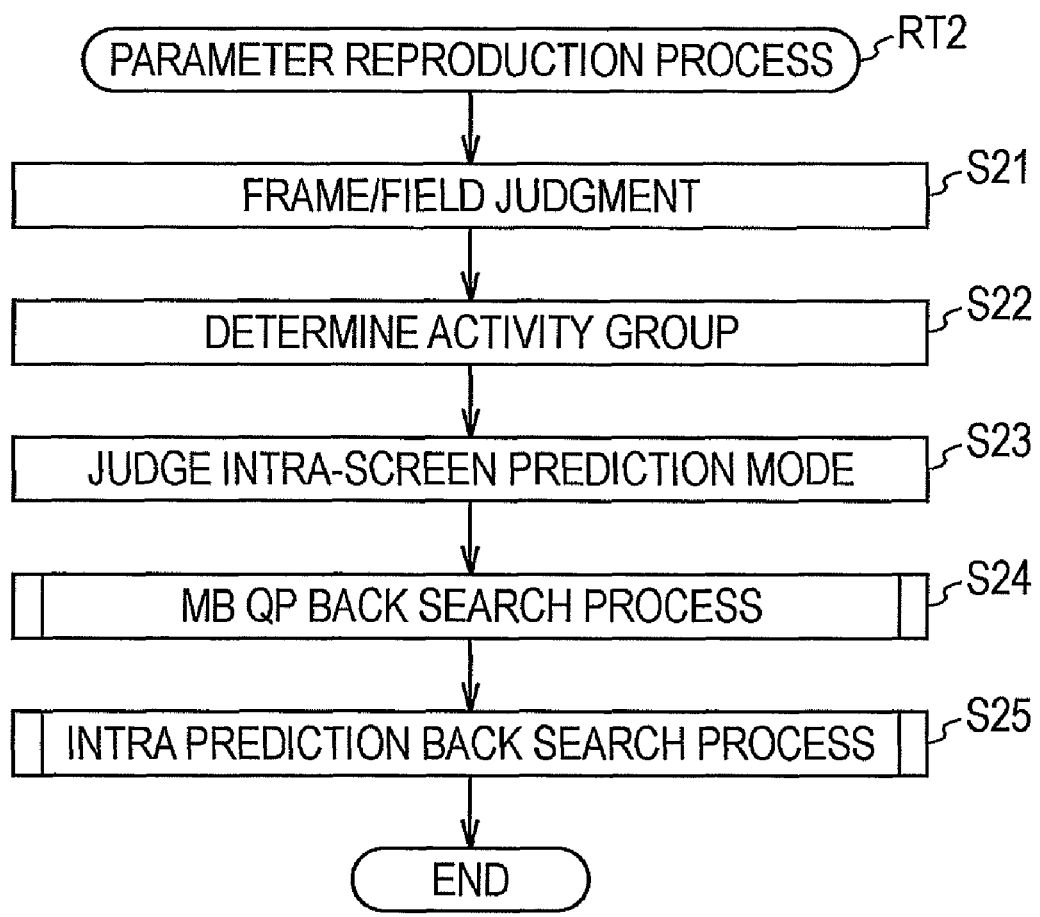
FIG. 8 is a flowchart illustrating a parameter reproducing process.

FIG. 7 illustrates and describes a relationship between the intra-screen prediction mode determining unit 11 and the parameter reproduction processing unit 60.

As illustrated in this FIG. 7, the intra-screen prediction mode determining unit 11 includes an MB frame/field judging unit 51, an activity group determining unit 52, and an intra-screen prediction mode judging unit 53. The parameter reproduction processing unit 60 includes a first intra prediction processing unit 61, a second intra prediction processing unit 62, a third intra prediction processing unit 63, DCT units 64 to 66, an MB QP back search unit 70, and an intra prediction back search unit 80.

Parameters of Intra AVC include AFF indicating whether a macro block is a field/frame, an offset of a quantization value (activity offset) of each MB, and an intra-screen prediction mode of 4×4, 8×8, and 16×16 (8×8/4×4 I-Prediction). The intra-screen prediction mode determining unit 11 determines these parameters on the basis of the input image 91.

Figure 10:
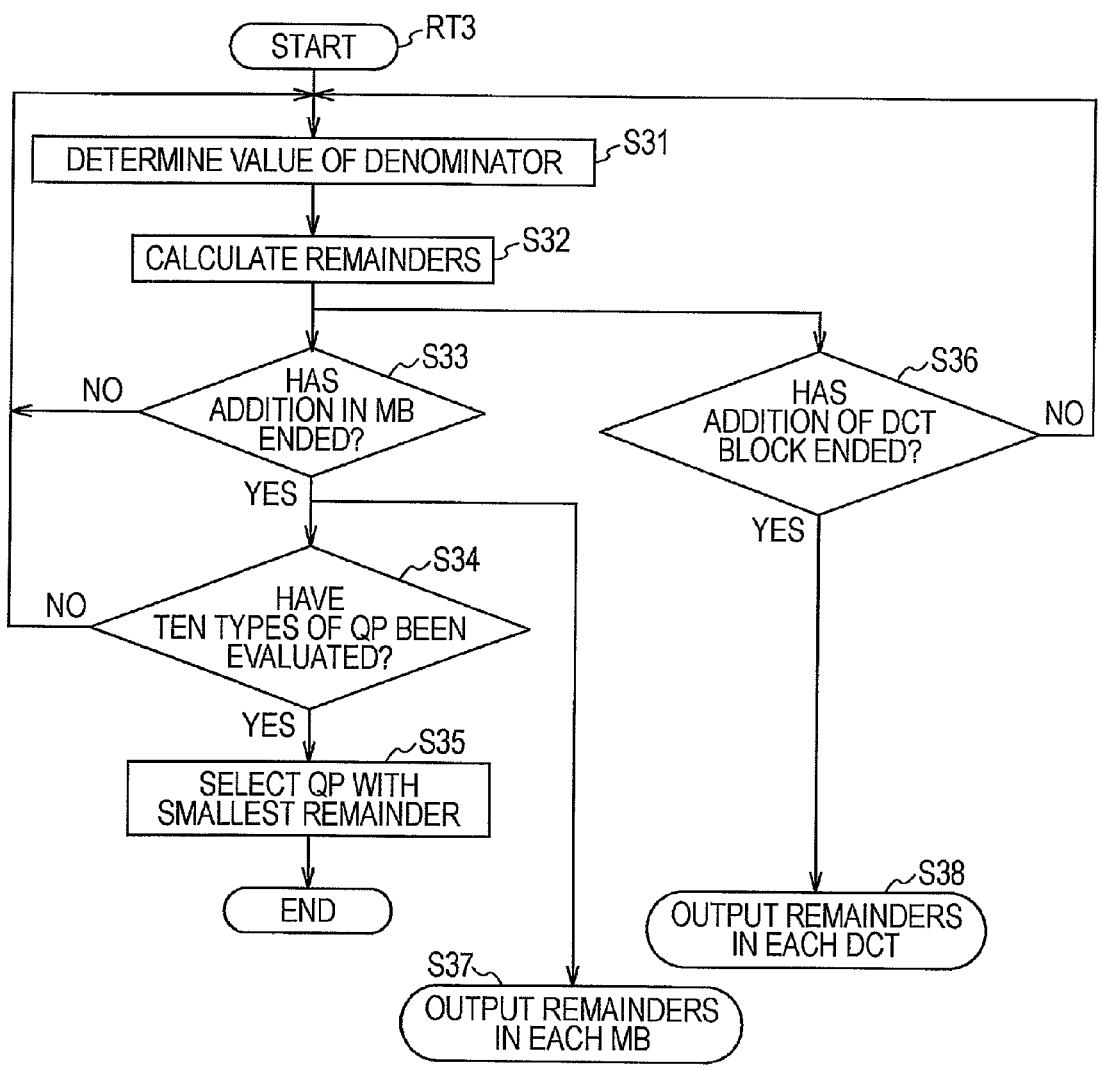
FIG. 10 is a flowchart illustrating an MB QP back search process.

Hereinafter, a parameter reproduction processing procedure RT2 will be described with reference to the flowchart illustrated in FIG. 10.

That is, the input image 91 is input to the MB frame/field judging unit 51. The MB frame/field judging unit 51 judges whether an MB is a frame or field by performing a process of obtaining the sum of squares of difference over all samples of the MB in inter-field correlation (step S21).

This process is a process of excluding MBs having exceptionally low flame correlation, such as fireworks or flash, from ordinary frame MBs and regarding it as a field MB. A judgment value for judging a field MB is large and is less likely to be influenced by quantization distortion, and thus the same judgment is performed with high probability even at second encoding.

The activity group determining unit 52 obtains four types of sum of squares from an average value of an 8×8 block to select a minimum value, and performs grouping (determines activity group) at a boundary value that is predetermined in accordance with a block of the minimum value (step S22). In a once-encoded signal, there exist many cases where a coefficient after DCT is rounded to zero as a result of quantization, and thus an activity (the sum of squares from an average value) decreases in many cases. The MB QP back search unit 70 described below searches for a prospective value as the preceding quantization parameter QP by shifting a quantization parameter QP in an increasing direction from the minimum.

In some cases, there exist two or three modes having an approximate prediction residual, and the intra-screen prediction mode judging unit 53 selects an intra-screen prediction mode different from that in the preceding encoding as the first candidate. The intra-screen prediction mode judging unit 53 obtains three candidates of intra-screen prediction modes: first, second, and third candidates in an optimum order, and outputs the candidates as parameters (step S23). In this example, the number of candidates is three, which corresponds to the simplification of the configuration on the parameter reproducing unit 60 side. The number of candidate intra-screen prediction modes is nine at a maximum. Any preferable number of nine or less is acceptable as the number of candidates, and of course the number is not limited to nine.

In view of those results, the parameter reproducing unit 60 uses a result of the prediction mode judging unit 53 as is as a result of AFF judgment.

The input image 91 is input to the parameter reproduction processing unit 60. The parameter reproduction processing unit 60 performs, by the first intra prediction processing unit 61, the second intra prediction processing unit 62, and the third intra prediction processing unit 63, a prediction process using the first, second, and third candidates of intra-screen prediction modes obtained by the intra-screen prediction mode judging unit 53, thereby generating difference image data.

Subsequently, the respective DCT units 64 to 66 perform a DCT process on the difference image data to generate DCT coefficients. The MB QP back search unit 70 detects a detected quantization parameter QPe using the first candidate of intra-screen prediction mode (step S24). The intra prediction back search unit 80 detects the intra-screen prediction mode used in the preceding encoding (step S25).

Here, the first intra prediction processing unit 61, the second intra prediction processing unit 62, and the third intra prediction processing unit 63 should normally use, as a predictive image, a local decode image on which dequantization and inverse DCT have been performed after quantization, but use the input image 91. Accordingly, the circuit configuration of the first intra prediction processing unit 61, the second intra prediction processing unit 62, and the third intra prediction processing unit 63 can be reduced, so that accumulation of error can be prevented in a case where an intra-screen prediction mode is different from that in the preceding encoding.

Figure 9:
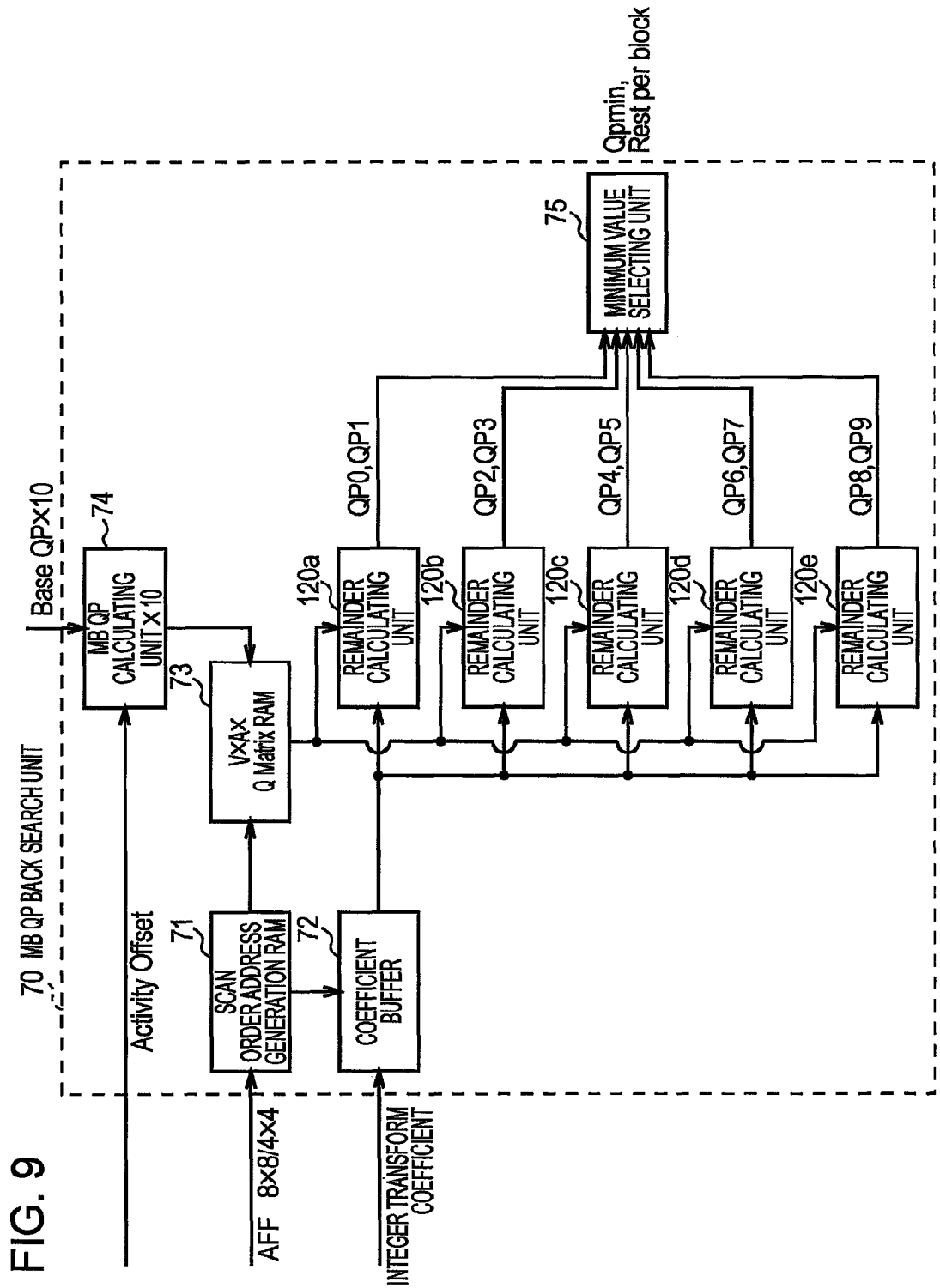
FIG. 9 is a detailed configuration diagram of an MB QP back search unit.

Next, FIG. 9 illustrates and describes a detailed configuration of the MB QP back search unit 70.

As illustrated in FIG. 9, the MB QP back search unit 70 includes a scan order address generation RAM 71, a coefficient buffer 72, a V×A×Q matrix RAM 73, an MB QP calculating unit (×10) 74, remainder calculating units 100a to 100e, and a minimum value selecting unit 75.

The MB QP calculating unit (×10) 74 of the MB QP back search unit 70 selects adaptive quantization parameters QPt to be used by adding an activity offset with ten types of selected quantization parameters QPl (QP0 to QP9) being average quantization parameters BaseQP. That is, the MB QP calculating unit (×10) 74 selects ten types of adaptive quantization parameters QPt. The scan order address generation RAM 71 generates DCT addresses indicating positions of supplied DCT coefficients and supplies the DCT addresses to the coefficient buffer 72 and the V×A×Q matrix RAM 73. The V×A×Q matrix RAM 73 calculates a rescaling factor RF using the following equation on the basis of a DCT address and an adaptive quantization parameter QPt. Here, A is a matrix representing fluctuation of a value of a coefficient element constituting a DCT coefficient in a relationship between the DCT coefficient and an inverse DCT coefficient, and RF is a rescaling factor that is used during decoding (see Patent Document 3).

$$RF = RFr^* A = \{V \, Q\text{Matrix} \, A \, 2^{floor(QP/6)}\} >> 4$$

Additionally, in the V×A×Q matrix RAM 73, the circuit is constituted from parameters of a dequantizing process of a decoder, whereby a bit length required for computation can be reduced compared to a conventional case where the circuit is constituted using a scaling factor of quantization on the encoder side, resulting in an effect of mainly reducing the circuit scale of the remainder calculating units 100a to 100e.

The DCT coefficients are once accumulated in the coefficient buffer 72. The scan order address generation RAM 71 controls the coefficient buffer 72 to output half samples (8/16 samples in 4×4 DCT, 32/64 samples in 8×8 DCT) in a scan order of encoding to the remainder calculating units 100a to 100e by repeating it twice. That is, the MB QP back search unit 70 regards only the first half coefficients in a DCT scan order (zigzag scan from a low-frequency component toward a high-frequency component) as process targets (evaluation targets). The remainder calculating units 100a to 100e can process two types of quantization parameters QP in a time sharing manner by regarding only half samples as evaluation targets, and thus the circuit serving as the remainder calculating units 100a to 100e can be reduced to half.

Furthermore, data in the latter-half portion of scan after DCT is mainly composed of coefficients that are rounded to zero during the preceding encoding and normally contains many error factors when the remainder is minimum. By evaluating only half samples, the MB QP back search unit 70 excludes coefficients that are rounded to zero during the preceding encoding, which generates an effect of improving detection precision. The V×A×Q matrix RAM 73 outputs a value that conforms to the scan phase of an output of the coefficient buffer 72.

In this embodiment, the MB QP back search unit 70 uses a decoder-side parameter defined by H.264.

This is described in the following equation.

Value of RAM=$V[QP][j][i] \times Q$ Matrix$[j][i] \times A[j][i]$ (j and i are 0 to 3 at 4×4 DCT and 0 to 7 at 8×8 DCT)

Additionally, in H.264, V[QP][j][i] is expressed as normAdjust (m, i,j) or normAdjust 8×8 (m, i, j), Q Matrix[j][i] is expressed as weightScale (i, j) or weightScale 8×8 (i,j), and A[j][i] is expressed as Aij.

Hereinafter, an MB QP back search process procedure RT3 will be described with reference to the flowchart illustrated in FIG. 10.

First, the MB QP back search unit 70 determines a rescaling factor RF (value of denominator) (step S31).

The value of denominator used for calculating remainders is obtained using the following equation.

Value of denominator=(value of RAM<<$(QP/6)$)>>4

The MB QP back search unit 70 calculates remainders for ten types of quantization parameters QP using the following equation (step S32).

Remainder=$\Sigma (DCT$ coefficient<<6)% value of denominator

Here, ten types are used in view of the following. The predictive quantization parameter QPd is roughly estimated on the basis of a result of the first pre-encoder 1, and thus the precision sufficiently increases if a predetermined range including the obtained predictive quantization parameter QPd is regarded as a process target.

In this way, the MB QP back search unit 70 judges whether addition of remainders has ended in each MB (step S33). If not ended, the process returns to step S31 and the forgoing process is repeated. On the other hand, if addition has ended, the MB QP back search unit 70 judges whether evaluation of all the ten types of quantization parameters QP has ended (step S34). If evaluation has not ended, the process returns to step S31 and the forgoing process is repeated. On the other hand, if evaluation has ended, the MB QP back search unit 70 collects remainders corresponding to the ten types of quantization parameters QP in units of macro blocks. The MB QP back search unit 70 compares the remainders corresponding to the ten types of quantization parameters QP, selects and outputs the QP corresponding to the minimum remainder (step S35), and the process ends. In this way, the MB QP back search unit 70 determines the quantization parameters QP of macro blocks on the basis of a remainder minimum condition. The parameter of an intra-screen prediction mode is reproduced in the remainder minimum condition.

Additionally, if it is judged in step S33 that addition of remainders in respective MBs has ended, the MB QP back search unit 70 outputs the remainders collected in the respective MBs to the intra prediction back search unit 80 (step S37).

Also, the MB QP back search unit 70 judges whether addition in a DCT block has ended after calculation of remainders (step S36). If addition has not ended, the process returns to step S31, and the foregoing process is repeated. On the other hand, if addition has ended, remainders collected in units of DCT blocks are also output to the intra prediction back search unit 80 for an intra prediction back search process (step S38).

Figure 11:
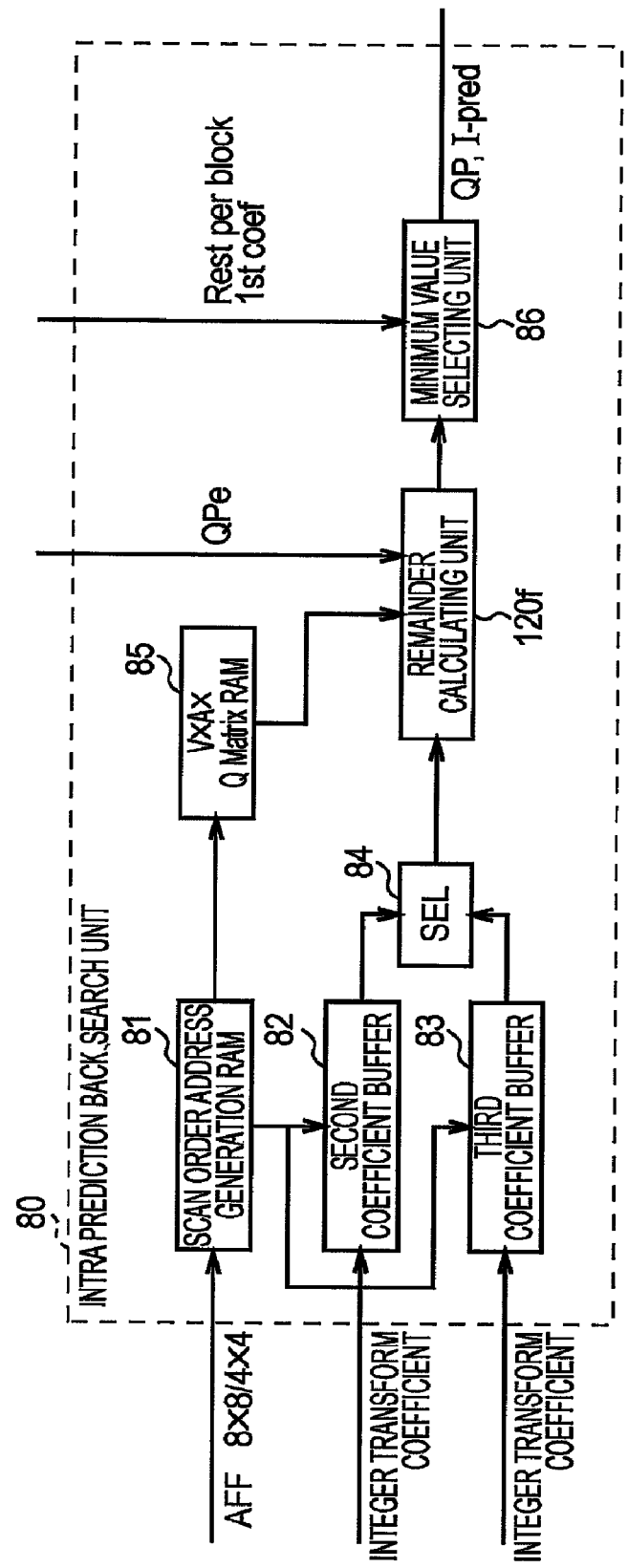
FIG. 11 is a detailed configuration diagram of an intra prediction back search unit.

FIG. 11 illustrates and describes a configuration of the intra prediction back search unit 80.

As illustrated in FIG. 11, the intra prediction back search unit 80 includes a scan order address generation RAM 81, a second coefficient buffer 82, a third coefficient buffer 83, a SEL 84, a V×A×Q matrix RAM 85, a remainder calculating unit 100f, and a minimum value selecting unit 86.

In this configuration, the intra prediction back search unit 80 estimates the intra-screen prediction mode used in the preceding encoding on the basis of the remainder minimum condition with respect to the second and third candidates of intra-screen prediction modes regarding the quantization parameters QP obtained in the MB QP back search unit 70.

Normally, the image encoding device 200 should have a process configuration of evaluating ten types of quantization parameters QP for all intra-screen prediction modes and selecting intra prediction of minimum in each DCT block, but this is not preferable because the circuit scale increases.

Accordingly, in this intra prediction back search unit 80, the above-described circuit configuration is employed to reduce the circuit scale on the basis of a characteristic in that some reproducibility of the first candidate of intra-screen prediction mode can be realized and that the quantization parameters QP of the preceding encoding can be reproduced with high probability in an MB QP back search process using the first candidate of intra-screen prediction mode. That is, the intra prediction back search unit 80 detects the intra-screen prediction mode used in the preceding encoding using the detected quantization parameter QPe that is detected using the first candidate of intra-screen prediction mode.

As illustrated in FIG. 11, transform coefficients using the second and third candidates of intra-screen prediction modes are accumulated in the second coefficient buffer 82 and the third coefficient buffer 83. The scan order address generation RAM 81 performs control to output half samples in a scan order of encoding from the second coefficient buffer 82 and the third coefficient buffer 83. The SEL 84 sequentially outputs the half samples in the scan order of encoding of the second coefficient buffer 82 and the third coefficient buffer 83 in a time sharing manner. The V×A×Q matrix RAM 85 and the remainder calculating unit 100f perform the same process as that described above with reference to FIG. 9. That is, the V×A×Q matrix RAM 73 outputs a value that conforms to the scan phase of an output of the coefficient buffer 72.

The minimum value selecting unit 86 selects, from among three candidates of intra-screen prediction modes, an intra-screen prediction mode for obtaining a minimum remainder in units of DCT blocks.

Figure 12:
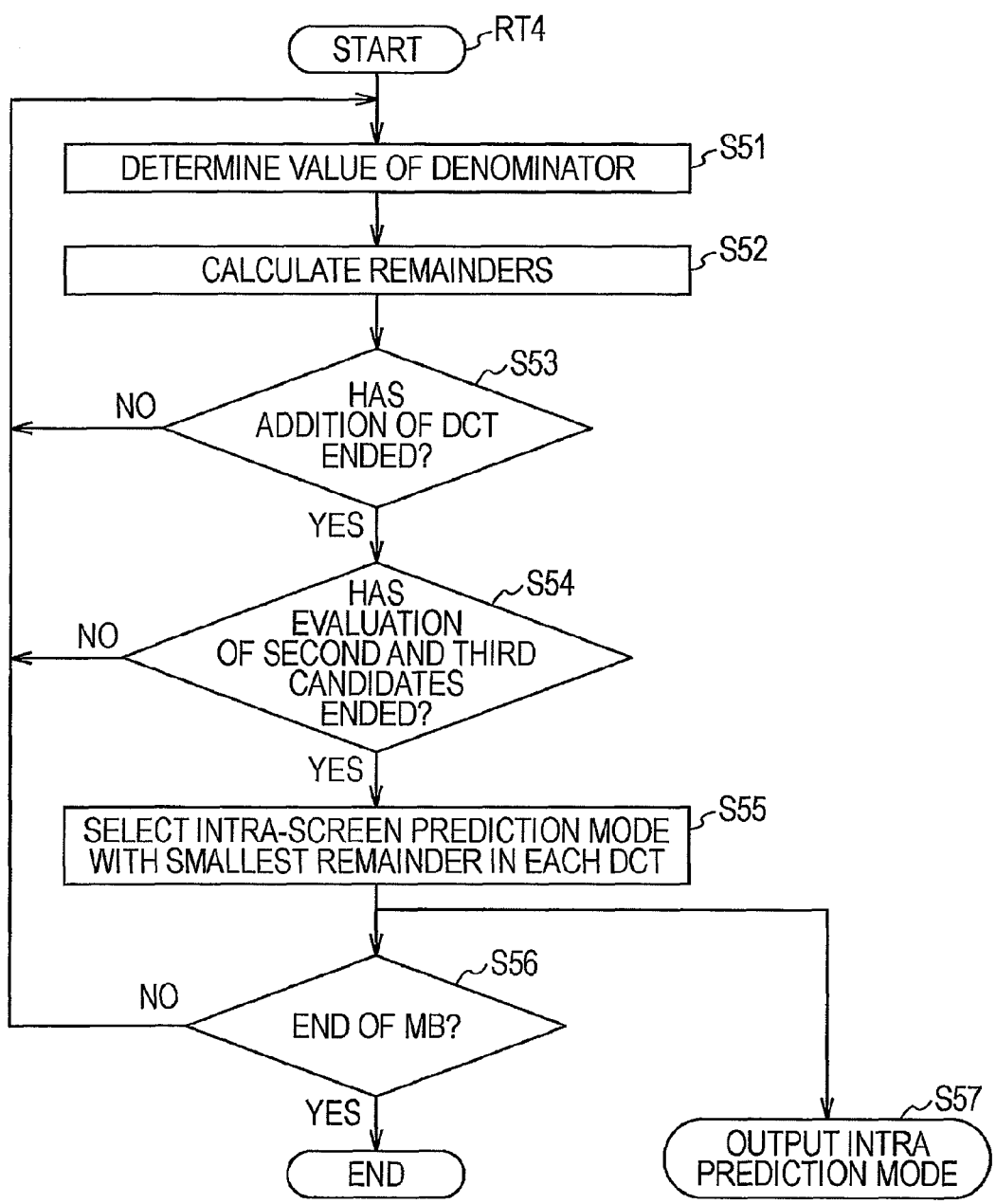
FIG. 12 is a flowchart illustrating an intra prediction back search process.

Hereinafter, an intra prediction back search process performed by the intra prediction back search unit 80 will be described with reference to the flowchart in FIG. 12 in accordance with a process procedure.

First, the intra prediction back search unit 80 determines the value of denominator (step S51). Additionally, the denominator used for calculating remainders is obtained in the same manner as in the foregoing MB QP back search unit 70. Subsequently, the intra prediction back search unit 80 obtains remainders in the same manner as in the foregoing MB QP back search unit 70 (step S52).

Then, the intra prediction back search unit 80 judges whether addition of DCT has ended (step S53). If addition has not ended, the process returns to step S51 and the foregoing process is repeated. On the other hand, if addition has ended, the intra prediction back search unit 80 judges whether the second and third candidates have been evaluated (step S54). If the second and third candidates have not been evaluated, the process returns to step S51 and the foregoing process is repeated. On the other hand, if the second and third candidates have been evaluated, the intra prediction back search unit 80 selects an intra-screen prediction mode corresponding to the minimum remainder selected by the minimum value selecting unit 86 (step S55) and outputs the intra-screen prediction mode (step S57).

Subsequently, the intra prediction back search unit 80 judges whether end of MB has come (step S56). If the end has not come, the process returns to step S51 and the foregoing process is repeated. On the other hand, if the end has come, the intra prediction back search unit 80 ends the process.

Figure 13:
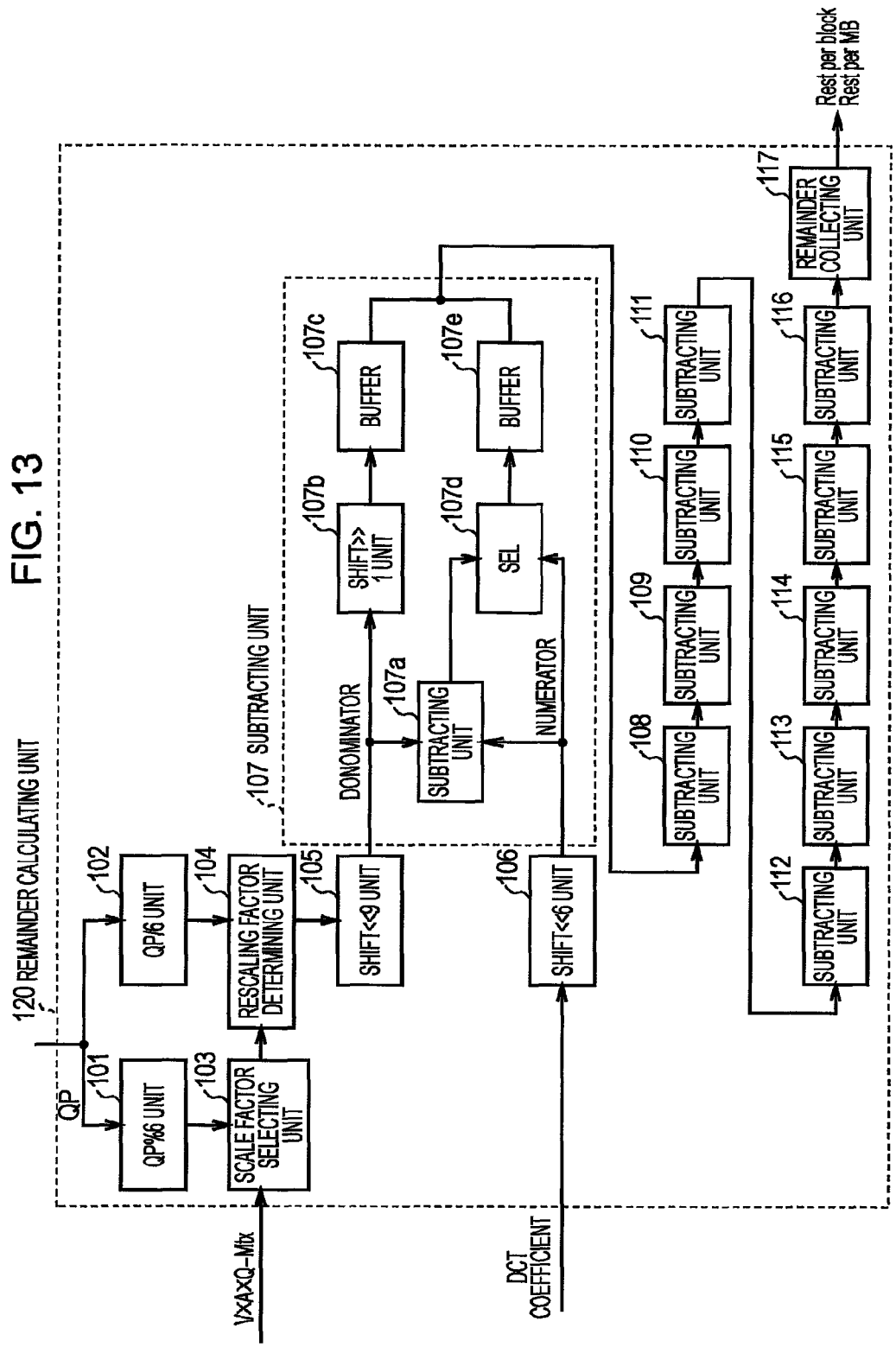
FIG. 13 is a detailed configuration diagram of a remainder calculating unit.

Next, FIG. 13 illustrates and describes a configuration of the remainder calculating unit 100.

As illustrated in FIG. 13, the remainder calculating unit 100 includes a QP %6 unit 101, a QP/6 unit 102, a scale factor selecting unit 103, a quantization value determining unit 104, a shift<<9 unit 105, a shift<<6 unit 106, subtracting units 107 to 116, and a remainder collecting unit 117. The subtracting unit 107 includes a subtracting unit 107a, a shift<<1 unit 107b, buffers 107c and 107e, and a SEL 107d. This is the same for the subtracting units 107 to 116.

In this configuration, the remainder calculating unit 100 performs a process of calculating a remainder obtained when a DCT coefficient is divided by the value of denominator (rescaling factor RF).

The QP %6 unit 101 and the QP/6 unit 102 are supplied with a detected quantization parameter QPe. The QP %6 unit 101 is supplied with a remainder obtained by dividing the detected quantization parameter QPe by "6". The V×A×Q matrix RAM 85 supplies V×A×Q matrix values that are acceptable in accordance with DCT addresses to the scale factor selecting unit 103. The scale factor selecting unit 103 selects a V×A×Q matrix value on the basis of a computation result generated by the QP %6 unit 101. The QP/6 unit 102 calculates a value obtained by dividing the detected quantization parameter QPe by "6" and supplies the value to the rescaling factor determining unit 104. The rescaling factor determining unit 104 determines the value of denominator. The shift<<9 unit 105 performs shift to the left of nine bits to sequentially obtain remainders starting from the remainder when the value of denominator is multiplied by 512.

On the other hand, DCT coefficients are input to the shift<<6 unit 106. This shift<<6 unit 106 performs shift to the left of six bits as an inverse transform process of rounding of dequantization in a decoder unit. This is a process corresponding to the state where the rescaling factor RFr is carried by six digits for preventing rounding at decoding. The scale of the remainder calculating unit 100 is large if a divider is combined in the circuit as a divider, and thus a process of performing approximation by ten stages of subtractors 107 to 116 is employed for a computing circuit for remainder values. In the subtracting units 107 to 116, subtracting a denominator from a numerator is performed. If numerator≧denominator is satisfied, the SEL 107d outputs the value obtained by subtracting the denominator from the numerator. In the other case, the SEL 107d outputs the value of numerator.

The shift>>1 unit 107b sets the value of denominator to half. The subtracting units 108 to 116 obtain results of remainders so as to connect processes in the subtracting units to a pipeline. The remainder collecting unit 117 calculates the total sums of remainders in units of DCT blocks and in units of macro blocks and outputs the total sums.

As described above, the image encoding device 200 uses an input image, not a local decode image, as an intra prediction image, so that processes including dequantization, DCT, and inverse intra prediction can be reduced. Also, propagation of error that occurs when a prediction mode cannot be reproduced can be prevented, so that detection precision increases.

Furthermore, the image encoding device 200 generates a quantization level value from a scale factor of a decoder, whereby the circuit scale of a computing unit can be reduced and the detection precision is increased.

Also, the image encoding device 200 performs a process on only the first half of coefficients in a DCT scan order, thereby being capable of processing one logic twice in a time sharing manner. Thus, the circuit can be reduced to half, and the detection precision is increased by reducing errors of zero coefficients.

Also, the image encoding device 200 determines QP of a macro block on the basis of a remainder minimum condition and then reproduces a parameter of an intra-screen prediction mode on the basis of the remainder minimum condition, whereby the number of stages of the circuit can be reduced.

Furthermore, in the image encoding device 200, the computing circuit for remainder values is approximated by subtraction of about ten stages, whereby the scale of the computing circuit of a divider can be reduced.

Additionally, the present invention is not limited to the above-described embodiment, and various improvements and changes can be accepted within the intention of the present invention.

For example, the above-described image encoding device and image encoding method can also be carried out as a computer program loaded to the device or a recording medium carrying the program, and a computer program executing the method or a recording medium carrying the program.

[2-3. Operation and Effect]

According to the above-described configuration, the image encoding device 100 detects, as detected quantization parameters QPe, quantization parameters QP that were used when the input image 91 was encoded the previous time in each MB, which is the unit of quantization, on the basis of remainders obtained by dividing the input image 91 on which DCT as orthogonal transformation has been performed by rescaling factors RF based on the quantization parameters QP, which are quantization factors. At this time, the image encoding device 100 divides only the first half of DCT coefficients as the input image 91 on which DCT has been performed.

Accordingly, the image encoding device 100 need not use the latter half portion in which DCT coefficient values are small and a difference in remainder with respect to a difference in quantization step is less likely to appear, so that the precision of back search can be increased.

The image encoding device 100 divides only the first half portion of the input image 91 on which DCT has been performed by a rescaling factor RF based on a quantization parameter QP by using the subtracting units 108 to 117 as subtractors having a ten-stage configuration.

Accordingly, in the image encoding device 100, the circuit configuration can be simplified with the smallest number of subtracting units 108 to 117 while keeping the precision of division in a range for maintaining the precision of back search.

3. Other Embodiments

Additionally, in the above-described first embodiment, a description has been given about a case where a DCT process as orthogonal transformation is executed on difference image data based on intra prediction as encoding target data and where quantization coefficients obtained through quantization are used. The present invention is not limited thereto. For example, the input image 91 may be used as encoding target data. As the input image 91, data on which any one or two of intra prediction, orthogonal transformation, and quantization has been performed may be used, and furthermore data on which another process has been performed may be used. Of course, wavelet transformation or the like can be used as orthogonal transformation.

Also, in the above-described first and second embodiments, a description has been given about a case where a 4×4 block is used as an encoding block serving as an encoding target. The present invention is not limited thereto. For example, another unit such as an 8×8 block or a 2×2 block may be used as an encoding block.

Furthermore, in the above-described first and second embodiments, a description has been given about a case where the number of nonzero coefficients is used as an encoding value. The present invention is not limited thereto. For example, various values according to an encoding method, such as the number of zero-runs, may be used as an encoding value.

Furthermore, in the above-described first and second embodiments, a description has been given about a case where nC=nA+nB is used as an average value of encoding values. The present invention is not limited thereto, and nC=nA+nB+1 may be used as an average value of encoding values for convenience of rounding in computation.

Furthermore, in the above-described first and second embodiments, a description has been given about a case where the present invention is applied to simplified encoding for calculating low-precision generated code quantities in the first pre-encoding unit 1. The present invention is not limited thereto. For example, the present invention may be applied to calculate high-precision generated code quantities in the second pre-encoding unit 2. Of course, use in the main encoding unit 3 is acceptable. Also, the present invention can be applied to image encoding devices having various configurations other than the image encoding device 100 including the first pre-coding unit 1, the second pre-coding unit 2, and the third pre-coding unit 3.

Furthermore, in the above-described first and second embodiments, a description has been given about a case where the quantizing unit 14 and the CAVLC calculating unit 15 having the configuration illustrated in FIG. 4 (having a shared unit) are provided. The present invention is not limited thereto, and a quantizing unit 14 and a CAVLC calculating unit 15 having other various configurations may be provided.

Furthermore, in the above-described first and second embodiments, a description has been given about a case where scaling factors MF and reciprocals of quantization matrixes Q Matrix are separately stored in the shared coefficient unit 150. The present invention is not limited thereto, and values calculated by multiplying scaling factors MF by reciprocals of quantization matrixes Q Matrix may be stored as multiplication coefficients. In this case, all multiplication coefficients that are acceptable according to DCT addresses are output, and a selecting unit selects a multiplication coefficient in accordance with a quantization parameter QP and a quantization matrix.

Furthermore, in the above-described first and second embodiments, a description has been given about a case where the subtractors 108 to 117 having a ten-stage configuration are provided instead of dividers. The present invention is not limited thereto. The number of subtractors is not particularly limited, and dividers may also be used.

Furthermore, in the above-described first and second embodiments, a description has been given about a case where only half of DCT coefficients on the low-frequency side are divided by rescaling factors RF. The present invention is not limited thereto. For example, one third or two thirds of DCT coefficients on the low-frequency side (first half scan portion) may be used as the first half portion.

Furthermore, in the above-described second embodiment, a description has been given about a case where a 4×4 block is used as the unit of quantization. The present invention is not limited thereto. For example, various block sizes such as 8×8 and 16×16 may be used as the unit of quantization.

Furthermore, in the above-described first and second embodiments, a description has been given about a case where the present invention is applied to AVC. The present invention is not limited thereto, and the present invention can be applied to various encoding methods for adaptively selecting VLC tables. For example, in a case where the present invention is applied to MPEG-2, a quantization scale is used as a quantization factor.

Furthermore, in the above-described first and second embodiments, a description has been given about a case where a generated code quantity of each picture is suppressed to within a target code quantity. The present invention is not limited thereto. For example, a generated code quantity of each slice may be suppressed to within a target code quantity.

Furthermore, in the above-described first and second embodiments, a description has been given about a case where a quantization parameter QP corresponding to a high-precision generated code quantity that is the most approximate to a target generated code quantity is determined to be a basic quantization parameter $QP_{MB}$. The present invention is not limited thereto. For example, a quantization parameter QP corresponding to a high-precision generated code quantity that is the most approximate to the target generated code quantity among high-precision generated code quantities smaller than the target generated code quantity may be determined to be the basic quantization parameter $QP_{MB}$.

Furthermore, in the above-described first and second embodiments, a description has been given about a case where the image encoding device 100 as an image processing device is configured using the TotalCoefLength bit length ROM 207 as a variable-length-table selecting unit and a variable-length encoding unit. The present invention is not limited thereto, and the image processing device of the present invention may be configured using a variable-length-table selecting unit and a variable-length encoding unit having other various configurations.

EXPLANATION OF REFERENCE NUMERALS

1 FIRST PRE-ENCODING UNIT,
2 SECOND PRE-ENCODING UNIT,
3 ENCODING UNIT,
4 CODE QUANTITY CONTROL UNIT,
5, 6 DELAY BUFFER,
11 INTRA-SCREEN PREDICTION MODE DETERMINING UNIT,
12 INTRA-SCREEN PREDICTION PROCESSING UNIT,
13 DCT UNIT,
14 QUANTIZING UNIT,
15 CAVLC CALCULATING UNIT,
21 INTRA-SCREEN PREDICTION PROCESSING UNIT,
22 DCT UNIT,
23 QUANTIZING UNIT,
24 CAVLC CALCULATING UNIT,
25 BUFFER,
26 IDCT UNIT,
27 DEQUANTIZING UNIT,
31 INTRA-SCREENPREDICTION PROCESSING UNIT,
32 DCT UNIT,
33 QUANTIZING UNIT,
34 ENTROPY ENCODING UNIT,
35 BUFFER,
36 IDCT UNIT,
37 DEQUANTIZINGUNIT,
40 PRECEDING MODE ESTIMATION PRE-ENCODING UNIT,
44 BUFFER,
45 QUANTIZING UNIT,
46 ENTROPY CODE LENGTH CALCULATING UNIT,
50 INTRA-SCREEN PREDICTION MODE DETERMINING UNIT,
60 PARAMETER REPRODUCTION PROCESSING UNIT,
70 MB QP BACK SEARCH UNIT,
80 INTRA PREDICTION BACK SEARCH UNIT,
120 REMAINDER CALCULATINGUNIT,
140 QUANTIZATION SHARED UNIT,
150 CAVLC SHARED CALCULATING UNIT

The invention claimed is:

1. An image processing device comprising:
a variable-length-table selecting unit configured to select a variable-length table corresponding to an average value obtained by averaging encoding values corresponding to upper-adjoining encoding blocks and left-adjoining encoding blocks of an encoding block as an encoding target in encoding an input image that is line-scanned in units of scan blocks,
wherein each scan block is constituted by a plurality of encoding blocks including a plurality of pixels,
wherein the variable-length-table selecting unit equates an encoding value of the upper-adjoining encoding block with that of the left-adjoining encoding block when the encoding block is at an upper end of a scan block;
a variable-length encoding unit configured to perform variable-length encoding on the encoding block by using the variable-length table;
a pre-encoding unit configured to encode the input image by quantizing the input image using a quantization step based on at least a quantization factor, thereby generating the encoding target data;
a basic quantization factor determining unit configured to determine a basic quantization factor in which a generated code quantity obtained by performing main encoding on the input image is predicted to be approximate to a target code quantity on the basis of a generated code quantity obtained by preforming variable-length encoding on the encoding target data by the variable-length encoding unit;
a main encoding unit configured to perform main encoding on the input image on the basis of the basic quantization factor determined by the basic quantization factor determining unit; and
a back search unit configured to perform division on only a first half portion of tramsformation coefficients of the input image on which orthogonal transformation has been performed when the hack search unit detects quantization factors used in a previous encoding.

2. The image processing device according to claim 1, wherein the back search unit performs division by resealing factors based on the quantization factors on only the first half portion of the input image on which orthogonal transformation has been performed with use of subtractors having a ten-stage configuration.

3. An image processing method comprising:
a variable-length-table selecting step of selecting a variable-length table corresponding to an average value of encoding values obtained by averaging encoding values corresponding to upper-adjoining encoding blocks and left-adjoining encoding blocks or an encoding block as an encoding target based on an input image that is line-scanned in units of scan blocks, wherein each scan block is constituted by a plurality of encoding blocks including a plurality of pixels, wherein the variable-length-table selecting unit equates an encoding value of the upper-adjoining encoding block with that of the left-adjoining encoding block when the encoding block is at an upper end of a scan block;

a variable-length encoding step of performing variable-length encoding on the encoding block by using the variable-length table;

a pre-encoding step of encoding the input image by quantizing the input image using a quantization step based on at least a quantization factor, thereby generating the encoding target data;

a basic quantization factor determining step of determining a basic quantization factor in which a generated code quantity obtained by performing main encoding on the input image is predicted to be approximate to a target code quantity on the basis of a generated code quantity obtained by performing variable-length encoding on the encoding target data in the variable-length encoding step;

a main encoding step of performing main encoding on the input image on the basis of the basic quantization factor determined in the basic quantization factor determining step; and a back searching step of performing division on only a first half portion of transformation coefficients of the input image on which orthogonal transformation has been performed when the back search step detects quantization factors used in a previous encoding.

* * * * *